US012467417B2

(12) United States Patent
Komori et al.

(10) Patent No.: US 12,467,417 B2
(45) Date of Patent: Nov. 11, 2025

(54) INTERNAL COMBUSTION ENGINE CONTROL DEVICE AND INTERNAL COMBUSTION ENGINE CONTROL METHOD

(71) Applicant: Hitachi Astemo, Ltd., Hitachinaka (JP)

(72) Inventors: Akihiro Komori, Hitachinaka (JP); Kunihiko Suzuki, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/834,871

(22) PCT Filed: Apr. 15, 2022

(86) PCT No.: PCT/JP2022/017915
§ 371 (c)(1),
(2) Date: Jul. 31, 2024

(87) PCT Pub. No.: WO2023/199508
PCT Pub. Date: Oct. 19, 2023

(65) Prior Publication Data

US 2025/0129755 A1 Apr. 24, 2025

(51) Int. Cl.
*B60T 7/12* (2006.01)
*F01N 3/20* (2006.01)
(Continued)

(52) U.S. Cl.
CPC ............... *F02D 41/30* (2013.01); *F01N 3/20* (2013.01); *F01N 3/22* (2013.01)

(58) Field of Classification Search
CPC .. F02D 13/02; F01N 11/007; F01N 2560/025; F01N 2560/14; F01N 2900/0416; F01N 3/101; F01N 11/00
(Continued)

(56) References Cited

U.S. PATENT DOCUMENTS 4,842,711 A * 6/1989 Asakura .............. G01N 27/417
123/693
8,001,765 B2 8/2011 Kawakita et al.
(Continued)

FOREIGN PATENT DOCUMENTS

JP 2000-110631 A 4/2000
JP 2008-255973 A 10/2008
(Continued)

OTHER PUBLICATIONS

International Search Report (PCT/ISA/210) issued in PCT Application No. PCT/JP2022/017915 dated May 24, 2022 with English translation (7 pages).
(Continued)

*Primary Examiner* — Logan M Kraft
*Assistant Examiner* — James J Kim
(74) *Attorney, Agent, or Firm* — Crowell & Moring LLP

(57) ABSTRACT

An internal combustion engine control device integrates an oxygen storage amount stored in a three-way catalyst in a period from an integration start position where combustion gas of an internal combustion engine obtained from an air-fuel ratio of exhaust gas starts to change from lean to rich or from rich to lean to an integration stop position where an oxygen concentration that has increased or decreased from before the integration start position is reversed.

7 Claims, 18 Drawing Sheets

(51) Int. Cl.
*F01N 3/22* (2006.01)
*F02D 41/30* (2006.01)

(58) Field of Classification Search
USPC .......................................................... 701/103
See application file for complete search history.

(56) References Cited

U.S. PATENT DOCUMENTS

| | | | | |
|---|---|---|---|---|
| 8,683,856 | B2 | 4/2014 | Kitaura | |
| 10,859,018 | B1 * | 12/2020 | Lee | F01N 3/101 |
| 11,454,154 | B2 | 9/2022 | Fey | |
| 2003/0230073 | A1 * | 12/2003 | Ikemoto | F01N 13/0093 60/285 |
| 2008/0245056 | A1 | 10/2008 | Kawakita et al. | |
| 2013/0180322 | A1 * | 7/2013 | Kitaura | F01N 11/007 73/114.75 |
| 2014/0191773 | A1 * | 7/2014 | Saijoh | G01N 27/4175 324/705 |
| 2020/0271039 | A1 * | 8/2020 | Kidd | F01N 11/00 |
| 2022/0065152 | A1 | 3/2022 | Fey | |

FOREIGN PATENT DOCUMENTS

| | | | |
|---|---|---|---|
| JP | 2012-57545 | A | 3/2012 |
| JP | 2017-31833 | A | 2/2017 |
| JP | 2022-42976 | A | 3/2022 |
| WO | WO 2011/132233 | A1 | 10/2011 |

OTHER PUBLICATIONS

Japanese-language Written Opinion (PCT/ISA/237) issued in PCT Application No. PCT/JP2022/017915 dated May 24, 2022 with English translation (7 pages).

* cited by examiner

MAIN REACTION PROCESS OF THREE-WAY CATALYST (OXIDATION REACTION)

$CO + O_2 \Rightarrow CO_2$ $H_2 + O_2 \Rightarrow H_2O$ $CnHm + O_2 \Rightarrow CO_2 + H_2O$ (NOx REDUCTION REACTION)

$CO + NO \Rightarrow CO_2 + N_2$

FIG. 6

(OXYGEN STORAGE/RELEASE REACTION)

$CeO_2 + CO \Rightarrow Ce_2O_3 + CO_2$ $CnHm + CeO_2 \Rightarrow Ce_2O_3 + CO + H_2O$ $Ce_2O_3 + O_2 \Rightarrow CeO_2$ $Ce_2O_3 + NO \Rightarrow CeO_2 + N_2$ (OXYGEN STORAGE RATIO)

$\Psi = CeO_2 /(Ce_2O_3 + CeO_2)$

FIG. 7

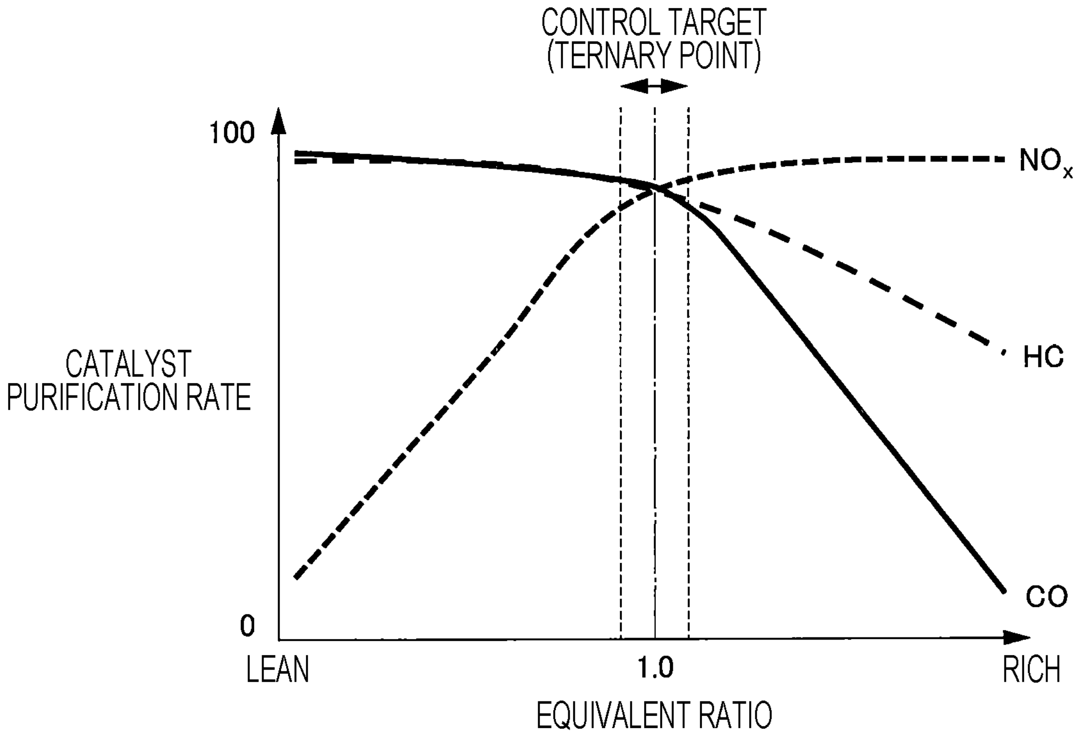

| | |
|---|---|
| CATALYST STATE | DETERIORATION |
| REAR OXYGEN SENSOR | NEW |

| | |
|---|---|
| CATALYST STATE | DETERIORATION |
| REAR OXYGEN SENSOR | DETERIORATION |

INTERNAL COMBUSTION ENGINE CONTROL DEVICE AND INTERNAL COMBUSTION ENGINE CONTROL METHOD

TECHNICAL FIELD

The present invention relates to an internal combustion engine control device and an internal combustion engine control method.

BACKGROUND ART

Conventionally, there is known a control technique in which a three-way catalyst is provided in an exhaust pipe of an internal combustion engine, an oxygen storage state in the three-way catalyst is captured by an exhaust gas sensor assembled before and after the three-way catalyst, and an air-fuel ratio is corrected according to a detection result of the oxygen storage state. In this control technique, rich correction of the air-fuel ratio is determined based on the oxygen storage state captured by a time integration of the product of the amount of air taken into the internal combustion engine and a difference value between an air-fuel ratio of the exhaust gas and a theoretical air-fuel ratio. Furthermore, the exhaust gas sensor assembled downstream of the three-way catalyst detects the presence or absence of oxygen released downstream of the three-way catalyst, thereby performing feedback correction of air-fuel ratio control. In the following description, the three-way catalyst is also abbreviated as a "catalyst".

CITATION LIST

Patent Literature

PTL 1: JP 2017-31833
PTL 2: JP 2012-57545

SUMMARY OF INVENTION

Technical Problem

An oxygen storage capacity in a catalyst changes as the deterioration of the catalyst progresses. Since the change in the oxygen storage capacity affects determination processing on whether air-fuel ratio correction control is executed performed by an electronic control device, the electronic control device needs to accurately diagnose a degree of deterioration of the catalyst. When the electronic control device erroneously determines the diagnosis of the deterioration state of the catalyst, the electronic control device cannot perform the optimum air-fuel ratio correction control and cannot maintain the oxygen storage capacity in an appropriate range.

In the technique described in Patent Literature 1, deterioration of the catalyst is determined based on the number of times of reversal (fluctuation) of a lean air-fuel ratio and a rich air-fuel ratio in an air-fuel ratio sensor provided on the upstream side of the catalyst and an oxygen sensor provided on the downstream side of the catalyst. However, the technique described in Patent Literature 1 does not take into consideration delay influence of a sensor signal due to deterioration of the oxygen sensor. For this reason, when the sensor signal is delayed although the t catalyst is in a deterioration state, a waveform similar to that of the sensor signal at a normal time is obtained, and thus there is a problem that the electronic control device erroneously diagnoses catalyst deterioration.

In view of such a problem, in a technique described in Patent Literature 2, the influence of response delay of an oxygen sensor disposed in an exhaust passage on a downstream side of a catalyst is eliminated to improve the diagnosis accuracy. In the technique described in Patent Literature 2, an oxygen storage capacity of the catalyst is corrected using a sensor response time measurement value of a previous trip to determine catalyst deterioration, thereby excluding the influence of deterioration of the oxygen sensor. However, even when the oxygen sensor is deteriorated, it is necessary to receive a signal from the oxygen sensor in a deterioration state once. In this case, the electronic control device cannot perform correction control according to the catalyst deterioration, and may not be able to cope with deterioration in emission performance (discharge amount reduction performance of NOx, CO, and HC discharged from tail pipe of internal combustion engine) during a period in which the correction control cannot be performed. Therefore, in order to prevent erroneous diagnosis of catalyst deterioration, it is necessary to accurately obtain the oxygen storage amount stored in the catalyst.

The present invention has been made in view of such a situation, and an object thereof is to accurately obtain an oxygen storage amount stored in a three-way catalyst.

Solution to Problem

An internal combustion engine control device according to the present invention controls an internal combustion engine including an air-fuel ratio sensor that is disposed upstream of a three-way catalyst provided in an exhaust pipe and detects an air-fuel ratio of exhaust gas and an oxygen concentration sensor that is disposed downstream of the three-way catalyst and detects an oxygen concentration of the exhaust gas. The internal combustion engine control device includes an oxygen storage amount integration unit that integrates an oxygen storage amount stored in the three-way catalyst in a period from an integration start position where combustion gas of the internal combustion engine obtained from the air-fuel ratio starts to change from lean to rich or from rich to lean to an integration stop position where the oxygen concentration that has increased or decreased from before the integration start position is reversed.

Advantageous Effects of Invention

According to the present invention, it is possible to prevent erroneous diagnosis of catalyst deterioration by accurately determining the oxygen storage amount stored in the three-way catalyst.

BRIEF DESCRIPTION OF DRAWINGS

FIG. 6 is a diagram for explaining a main reaction process of a three-way catalyst (ceria system) used in the post-processing system according to the first embodiment of the present invention.

FIG. 7 is a diagram for explaining a tendency of purification efficiency of the three-way catalyst with respect to an exhaust gas equivalent ratio at a catalyst activation temperature or higher according to the first embodiment of the present invention.

DESCRIPTION OF EMBODIMENTS

Figure 1:
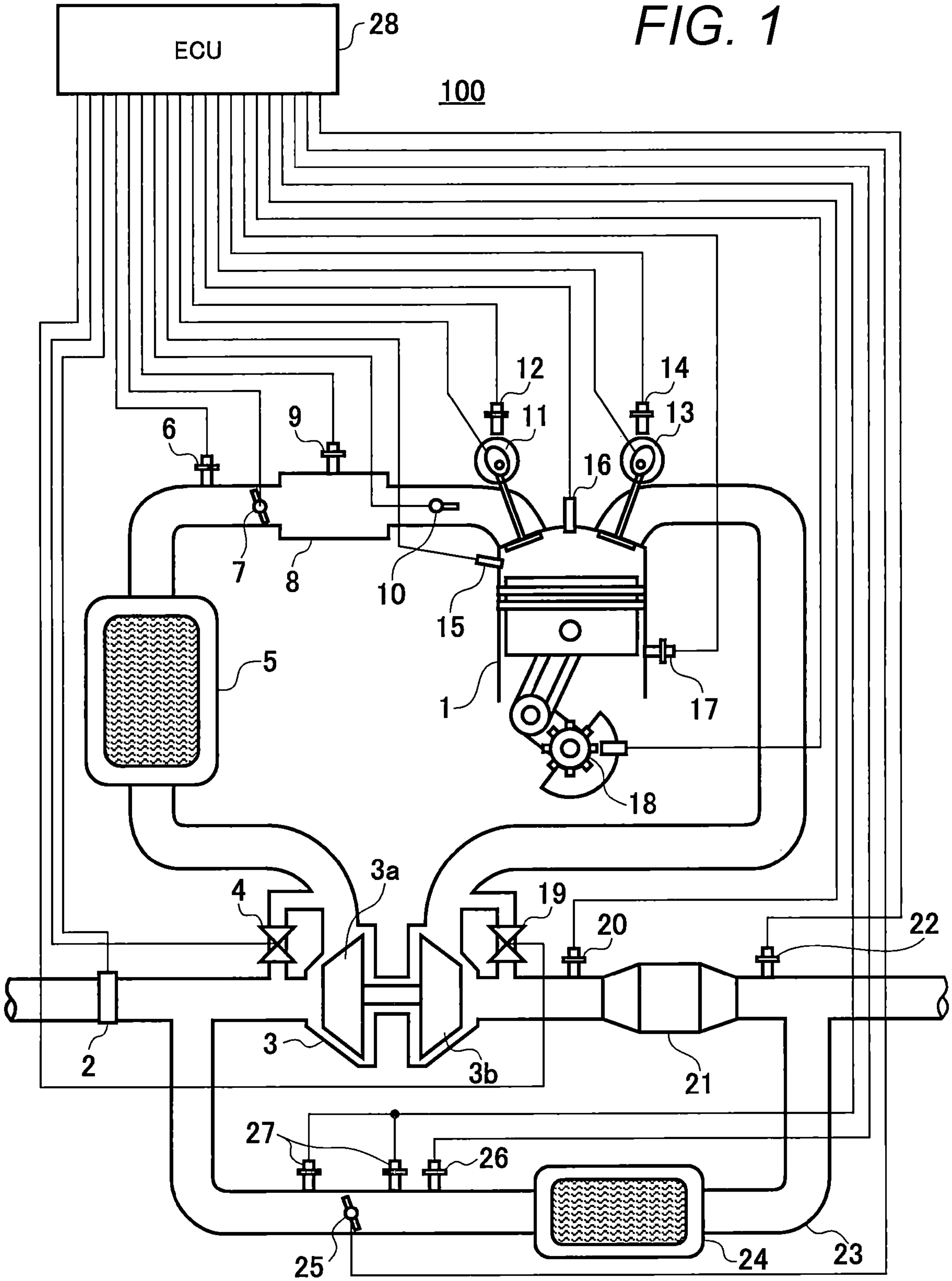
FIG. 1 is an overall schematic configuration diagram of an internal combustion engine control system according to a first embodiment of the present invention.

Hereinafter, embodiments of the present invention will be described with reference to the accompanying drawings. In the present specification and the drawings, components having substantially the same function or configuration are denoted by the same reference numerals, and redundant description is omitted.

First Embodiment

FIG. 1 is an overall schematic configuration diagram of an internal combustion engine control system 100.

The internal combustion engine control system 100 includes an internal combustion engine 1, a flow rate sensor 2, a turbocharger 3, an air bypass valve 4, an intercooler 5, a supercharging temperature sensor 6, a throttle valve 7, an intake manifold 8, a supercharging pressure sensor 9, a flow enhancing valve 10, an intake valve 11, an exhaust valve 13, a fuel injection valve 15, an ignition plug 16, a knock sensor 17, a crank angle sensor 18, a wastegate valve 19, a front air-fuel ratio sensor 20, an exhaust purification catalyst (three-way catalyst) 21, a rear oxygen sensor 22, an Exhaust Gas Recirculation (EGR) pipe 23, an EGR cooler 24, an EGR valve 25, a temperature sensor 26, a differential pressure sensor 27, and an engine control unit (ECU) 28. The rear oxygen sensor 22 can be replaced with an air-fuel ratio sensor.

An intake flow path and an exhaust flow path communicate with the internal combustion engine 1. A flow rate sensor 2 that detects a flow rate of intake air and an intake air temperature sensor built in the flow rate sensor 2 are assembled to the intake flow path. The intake air temperature sensor measures an intake air temperature.

The turbocharger 3 includes a compressor 3*a* and a turbine 3*b*, the compressor 3*a* is connected to the intake flow path, and the turbine 3*b* is connected to the exhaust flow path. The turbine 3*b* of the turbocharger 3 converts energy of the exhaust gas from the internal combustion engine 1 into rotational energy of a turbine blade. The compressor 3*a* of the turbocharger 3 compresses the intake air flowing in from the intake flow path by rotation of a compressor blade connected to a turbine blade.

The intercooler 5 is provided downstream of the compressor 3*a* of the turbocharger 3, and cools the intake air temperature of the intake air that has been adiabatically compressed and increased by the compressor 3*a*. The supercharging temperature sensor 6 is assembled downstream of the intercooler 5 and measures the temperature (supercharging temperature) of the intake air cooled by the intercooler 5.

The throttle valve 7 is provided downstream of the intercooler 5, narrows the intake flow path, and controls an intake air amount flowing into a cylinder of the internal combustion engine 1. The throttle valve 7 is configured by an electronically controlled butterfly valve capable of controlling a valve opening independently of an accelerator pedal depression amount by a driver. The intake manifold 8 to which the supercharging pressure sensor 9 is assembled communicates downstream of the throttle valve 7.

Note that the intake manifold 8 provided downstream of the throttle valve 7 and the intercooler 5 may be integrated. In this case, since the volume from the downstream of the compressor 3*a* to the cylinder can be reduced, it is possible to improve the responsiveness and controllability of acceleration/deceleration.

The flow enhancing valve 10 is disposed downstream of the intake manifold 8, and enhances the turbulence of the flow inside the cylinder by generating a drift in the intake air sucked into the cylinder. When the exhaust gas recirculation combustion described later is performed, the turbulent flow combustion is promoted and stabilized by closing the flow enhancing valve. The internal combustion engine 1 includes the intake valve 11 and the exhaust valve 13.

Each of the intake valve 11 and the exhaust valve 13 has a variable valve mechanism for continuously changing a phase of valve opening and closing. Sensors 12 and 14 for detecting an open/close phase of the valve are respectively assembled to the variable valve mechanisms of the intake valve 11 and the exhaust valve 13. A cylinder of the internal combustion engine 1 includes a direct injection fuel injection valve 15 that directly injects fuel into the cylinder. The fuel injection valve 15 may be of a port injection type that injects fuel into the intake port.

In a cylinder of the internal combustion engine 1, the ignition plug 16 that exposes an electrode portion in the cylinder and ignites a combustible air-fuel mixture by a spark is assembled. The knock sensor 17 is provided in a cylinder block, and detects the presence or absence of knock by detecting cylinder block vibration caused by combustion pressure vibration generated in a combustion chamber. The crank angle sensor 18 is assembled to a crankshaft, and outputs a signal corresponding to a rotation angle of the crankshaft to the ECU 28 as a signal indicating a rotation speed.

The front air-fuel ratio sensor 20 is disposed downstream of the turbine 3*b* of the turbocharger 3 and upstream of a three-way catalyst (exhaust purification catalyst 21) provided in the exhaust pipe. Then, the air-fuel ratio sensor (front air-fuel ratio sensor 20) outputs a signal indicating an exhaust gas composition detected from the exhaust gas, that is, the air-fuel ratio to the ECU 28. The exhaust purification catalyst 21 is a three-way catalyst and is provided downstream of the front air-fuel ratio sensor 20. The exhaust purification catalyst 21 purifies harmful exhaust gas components such as carbon monoxide, nitrogen compounds, and unburned hydrocarbon in the exhaust gas by a catalytic reaction. The rear oxygen sensor 22 is disposed downstream of the exhaust purification catalyst 21. The rear oxygen sensor 22 detects the presence or absence of oxygen contained in the exhaust gas after purification by the exhaust purification catalyst 21, that is, the oxygen concentration of the exhaust gas. Hereinafter, the exhaust purification catalyst 21 is also referred to as a three-way catalyst or a catalyst.

The turbocharger 3 includes an air bypass valve 4 and a wastegate valve 19. The air bypass valve 4 is disposed on a bypass flow path connecting the upstream and the downstream of the compressor 3*a* in order to prevent the pressure from excessively increasing from the downstream of the compressor 3*a* to the upstream of the throttle valve 7. When the throttle valve 7 is rapidly closed in a supercharged state, the air bypass valve 4 is opened according to the control of the ECU 28, whereby the compressed intake air in the downstream portion of the compressor 3*a* flows back to the upstream portion of the compressor 3*a* through the bypass flow path. As a result, by immediately decreasing the supercharging pressure, a phenomenon called surging can be prevented, and damage of the compressor 3*a* can be appropriately prevented.

The wastegate valve 19 is disposed on a bypass flow path connecting the upstream and downstream of the turbine 3*b*. The wastegate valve 19 is an electric valve whose valve opening degree can be freely controlled with respect to supercharging pressure by control of the ECU 28. When the opening degree of the wastegate valve 19 is adjusted by the ECU 28 based on the supercharging pressure detected by the supercharging pressure sensor 9, a part of the exhaust gas passes through the bypass flow path, so that the work given to the turbine 3*b* by the exhaust gas can be reduced. As a result, the wastegate valve 19 can maintain the supercharging pressure at a target pressure.

The EGR pipe 23 communicates an exhaust flow path in a downstream portion of the exhaust purification catalyst 21 and an intake flow path in an upstream portion of the compressor 3*a*, divides the exhaust gas from the downstream of the exhaust purification catalyst 21, and returns the exhaust gas to the upstream portion of the compressor 3*a*. The EGR cooler 24 provided in the EGR pipe 23 cools the exhaust gas. The EGR valve 25 is provided downstream of the EGR cooler 24 and controls the flow rate of the exhaust gas. The EGR pipe 23 is provided with the temperature sensor 26 that detects the temperature of the exhaust gas in the upstream portion of the EGR valve 25 and the differential pressure sensor 27 that detects the differential pressure between the upstream and the downstream of the EGR valve 25.

The ECU 28 includes a central processing unit (CPU), a read only memory (ROM), a random access memory (RAM), an analog-to-digital (A/D) converter, a driver circuit, and the like, and is an arithmetic circuit that controls each component of the internal combustion engine control system 100 and executes various data processes. Various sensors and various actuators described above are connected to the ECU 28. The ECU 28 controls operations of actuators such as the throttle valve 7, the intake valve 11, the exhaust valve 13, the fuel injection valve 15, and the EGR valve 25. In addition, the ECU 28 detects an operation state of the internal combustion engine 1 based on signals input from various sensors, and causes the ignition plug 16 to ignite at a timing determined according to the operation state.

[Hardware Configuration Example of Internal Combustion Engine Control Device]

Figure 2:
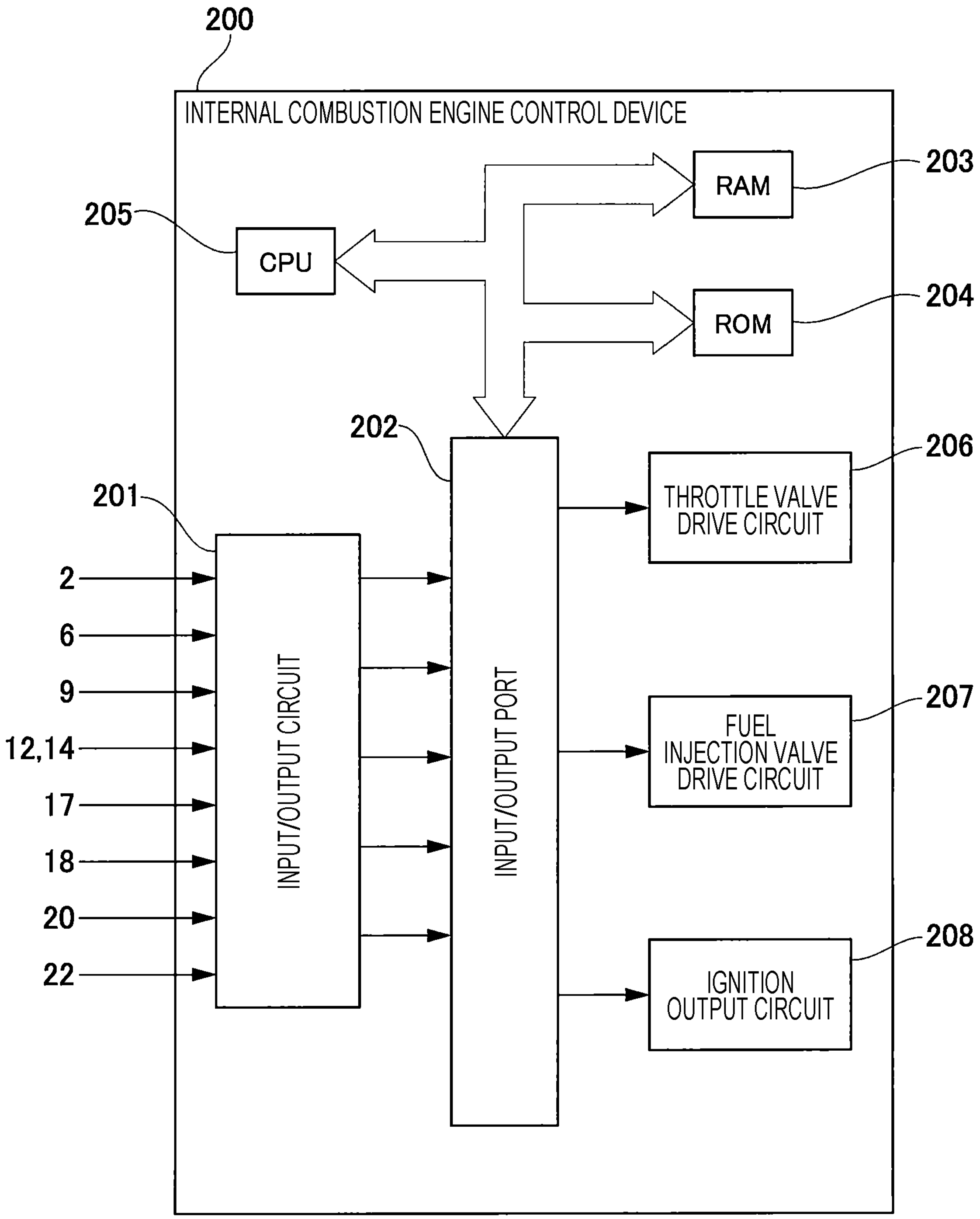
FIG. 2 is a block diagram illustrating a hardware configuration example of an ECU according first embodiment of the present invention.

FIG. 2 is a block diagram illustrating a hardware configuration example of the ECU 28.

The ECU 28 includes an input circuit 201, an input/output port 202, a RAM 203, a ROM 204, a CPU 205, a throttle valve drive circuit 206, a combustion injection valve drive circuit 207, and an ignition output circuit 208.

Output signals from various sensors are input to the input circuit 201. FIG. 2 illustrates an example in which output signals of the throttle sensor of the throttle valve 7, the flow rate sensor 2, the supercharging temperature sensor 6, the supercharging pressure sensor 9, a valve opening/closing phase sensors 12 and 14, the knock sensor 17, the crank angle sensor 18, the front air-fuel ratio sensor 20, the rear oxygen sensor 22, and the like are input to the input circuit 201 of the ECU 28. The signal input to the input circuit 201 is transmitted to the input/output port 202.

The signal transmitted to the input/output port 202 is stored in the RAM 203 and is subjected to arithmetic processing by the CPU 205. The control program describing the contents of the arithmetic processing is written in advance in the ROM 204 and is executed by the CPU 205. The ROM 204 records programs, data, and the like necessary for the operation of the CPU 205, and is used as an example of a computer-readable non-transitory storage medium storing a program executed by the ECU 28.

The control signal calculated by the CPU 205 according to the control program is output to each device such as the throttle valve drive circuit 206, the combustion injection valve drive circuit 207, and the ignition output circuit 208.

The throttle valve drive circuit 206 outputs a drive signal for controlling opening and closing drive of the throttle valve 7 to the throttle valve 7.

The combustion injection valve drive circuit 207 outputs a drive signal for controlling opening/closing drive of the fuel injection valve 15 at the fuel injection timing to the fuel injection valve 15.

The ignition output circuit 208 outputs a drive signal for controlling ignition of the ignition plug 6 at the ignition timing to the ignition output circuit 208.

<Internal Configuration Example of ECU>

Figure 3:
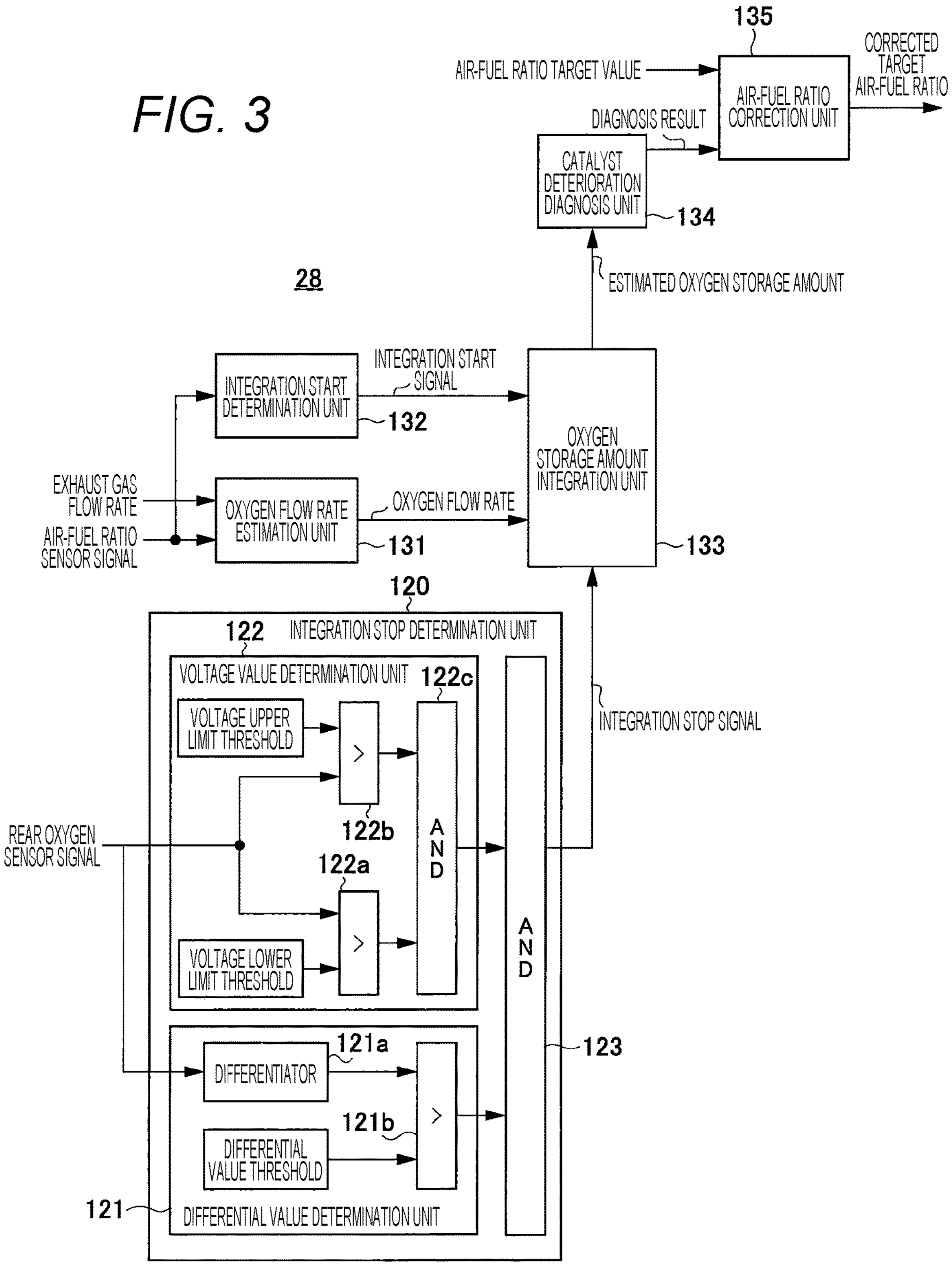
FIG. 3 is a block diagram illustrating an internal configuration example of an ECU according to the first embodiment of the present invention.

FIG. 3 is a block diagram: illustrating an internal configuration example of the ECU 28. The ECU 28 has various functions, and here, a function in which the ECU 28 obtains the target air-fuel ratio based on the air-fuel ratio sensor signal and the rear oxygen sensor signal will be described.

The ECU 28 includes an integration stop determination unit 120, an oxygen flow rate estimation unit 131, an integration start determination unit 132, an oxygen storage amount integration unit 133, a catalyst deterioration diagnosis unit 134, and an air-fuel ratio correction unit 135.

First, an internal configuration example of the integration stop determination unit 120 will be described.

The integration stop determination unit (integration stop determination unit 120) determines an integration stop position in integration processing of the oxygen storage amount. The integration stop determination unit 120 includes a differential value determination unit 121, a voltage value determination unit 122, and a condition determination unit 123.

The differential value determination unit 121 determines a differential value of the rear oxygen sensor voltage. The differential value determination unit 121 includes a differentiator 121*a* and a determination unit 121*b*.

The differentiator 121*a* calculates a differential value of the rear oxygen sensor voltage based on the rear oxygen sensor voltage signal input from the rear oxygen sensor 22. The differential value has a positive or negative sign according to a change direction of the voltage value output from the oxygen concentration sensor (rear oxygen sensor 22). The positive and negative signs of the differential value threshold are different depending on whether the air-fuel ratio is richer than the theoretical air-fuel ratio or leaner.

The determination unit 121*b* compares the differential value of the rear oxygen sensor voltage with the differential value threshold, and detects timing at which the differential value of the rear oxygen sensor voltage becomes larger than the differential value threshold as rising timing (ON) the differential value. Therefore, the determination unit 121*b* converts the differential value and the differential value threshold of the rear oxygen sensor voltage into absolute values. The rising timing of the differential value is output to the condition determination unit 123.

The voltage value determination unit 122 detects whether or not the rear oxygen sensor voltage is within a predetermined value range. The voltage value determination unit 122 includes a voltage lower limit determination unit 122*a*, a voltage upper limit determination unit 122*b*, and a voltage range determination unit 122*c*.

The voltage lower limit determination unit 122*a* compares the rear oxygen sensor voltage with the voltage lower limit threshold based on the rear oxygen sensor voltage signal input from the rear oxygen sensor 22. Then, the voltage lower limit determination unit 122*a* outputs an ON signal to the voltage range determination unit 122*c* when the rear oxygen sensor voltage is equal to or higher than the voltage lower limit threshold.

The voltage upper limit determination unit 122*b* compares the rear oxygen sensor voltage with the voltage upper limit threshold based on the rear oxygen sensor voltage signal input from the rear oxygen sensor 22. When the rear oxygen sensor voltage is less than the voltage upper limit threshold, voltage upper limit determination unit 122*b* outputs an ON signal to voltage range determination unit 122*c*.

When ON signals are input from both the voltage lower limit determination unit 122*a* and the voltage upper limit determination unit 122*b* (AND condition), the voltage range determination unit 122*c* outputs an in-voltage range signal (ON signal) to the condition determination unit 123.

When ON signals are input from both the differential value determination unit 121 and the voltage value determination unit 122 (AND condition), the condition determination unit 123 outputs an integration stop signal to the oxygen storage amount integration unit 133. The integration stop signal is a signal for instructing stop of the integration processing of the oxygen storage amount in the oxygen storage amount integration unit 133, and represents timing of stopping the integration of the oxygen storage amount.

Next, a configuration example of functional units other than the integration stop determination unit 120 will be described.

The oxygen flow rate estimation unit (oxygen flow rate estimation unit 131) estimates the oxygen flow rate of the exhaust gas based on the flow rate of the exhaust gas and the air-fuel ratio obtained from the air-fuel ratio sensor signal. The estimated oxygen flow rate is output to the oxygen storage amount integration unit 133.

The integration start determination unit (integration start determination unit 132) determines the start of the integration of the oxygen storage amount based on the air-fuel ratio obtained from the air-fuel ratio sensor signal. Then, the integration start determination unit 132 outputs an integration start signal for instructing the oxygen storage amount integration unit 133 to start the integration of the oxygen storage amount.

The oxygen storage amount integration unit (oxygen storage amount integration unit 133) integrates the oxygen storage amount stored in the three-way catalyst (exhaust purification catalyst 21) in a period from the integration start position to the integration stop position. The integration start position is instructed by the integration start signal. The integration stop position is instructed by the integration stop signal. The integration start position is a timing at which the combustion gas of the internal combustion engine (internal combustion engine 1) obtained from the air-fuel ratio detected by the front air-fuel ratio sensor 20 starts to change from lean to rich or from rich to lean. The integration stop position is a timing at which the oxygen concentration that has increased or decreased from before the integration start position is reversed. Therefore, the oxygen storage amount integration unit 133 starts the integration of the oxygen storage amount based on the oxygen flow rate when the integration start signal is input, and stops the integration of the oxygen storage amount when the integration stop signal is input. As described above, the oxygen storage amount integration unit (oxygen storage amount integration unit 133) integrates the oxygen storage amount based on the oxygen flow rate, the integration start position, and the integration stop position. Therefore, the oxygen storage amount integration unit 133 can accurately obtain the oxygen storage amount. Then, the oxygen storage amount integration unit 133 outputs the integrated oxygen storage amount to the catalyst deterioration diagnosis unit 134 as the estimated oxygen storage amount.

The catalyst diagnosis unit (catalyst deterioration diagnosis unit 134) diagnoses the state of the three-way catalyst (exhaust purification catalyst 21) based on the oxygen storage amount (estimated oxygen storage amount) and outputs a diagnosis result. The diagnosis result of the deterioration diagnosis of the three-way catalyst is output to the air-fuel ratio correction unit 135. Here, the diagnosis result is expressed as a state level value assigned to each state of the three-way catalyst (exhaust purification catalyst 21). This state level value represents a deterioration state of the three-way catalyst. For example, when the three-way catalyst is new, "1" is assigned to the state level value without deterioration, and "2" is assigned to the state level value when the three-way catalyst deteriorates. In addition, the deterioration state may be subdivided such that "21" is assigned to the state level value when the deterioration of the three-way catalyst is not progressed, and "22" is assigned to the state level value when the deterioration is progressed. In addition, the state level value may be represented by an alphabetic character or a combination of alphanumeric characters.

The air-fuel ratio correction unit (air-fuel ratio correction unit 135) corrects the target air-fuel ratio of the internal combustion engine (internal combustion engine 1) according to the air-fuel ratio target value and the diagnosis result, and outputs the corrected target air-fuel ratio. Then, the air-fuel ratio correction unit 135 outputs the calculated target value of the air-fuel ratio as the corrected target air-fuel ratio. Since the diagnosis result is expressed as the state level value, the air-fuel ratio target value correction unit 135 can advance correction processing of the target air-fuel ratio by tabulating the correction amount of the target air-fuel ratio according to the state level value in advance.

Thereafter, the ECU 28 performs output control of the internal combustion engine 1 in accordance with the corrected target air-fuel ratio.

<Configuration Example of Post-Processing System>

Next, a configuration example of a post-processing system 110 that purifies the exhaust gas of the internal combustion engine will be described with reference to FIGS. 4A to 4C.

Figure 4A:
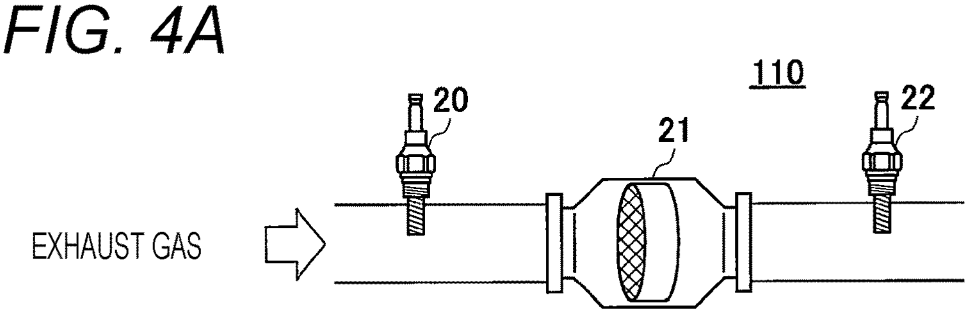
FIG. 4A is a schematic diagram illustrating a configuration example of a post-processing system according to the first embodiment of the present invention.

FIG. 4A is a schematic diagram illustrating a configuration example of the post-processing system 110.

As described above, in the post-processing system 110, a three-way catalyst is used as the exhaust purification catalyst 21. For the purpose of maintaining the purification efficiency of the three-way catalyst at an optimum point, sensors for detecting the exhaust gas composition are provided in an upstream portion and a downstream portion of the three-way catalyst, respectively. For example, the post-processing system 110 includes the front air-fuel ratio sensor 20 in an upstream portion (front) and the rear oxygen sensor 22 in a downstream portion (rear). According to this configuration, the front air-fuel ratio sensor 20 can measure the air-fuel ratio of the exhaust gas flowing into the three-way catalyst. Further, the rear oxygen sensor 22 can detect the presence or absence of oxygen contained in the exhaust gas after the catalyst purification.

Figure 4B:
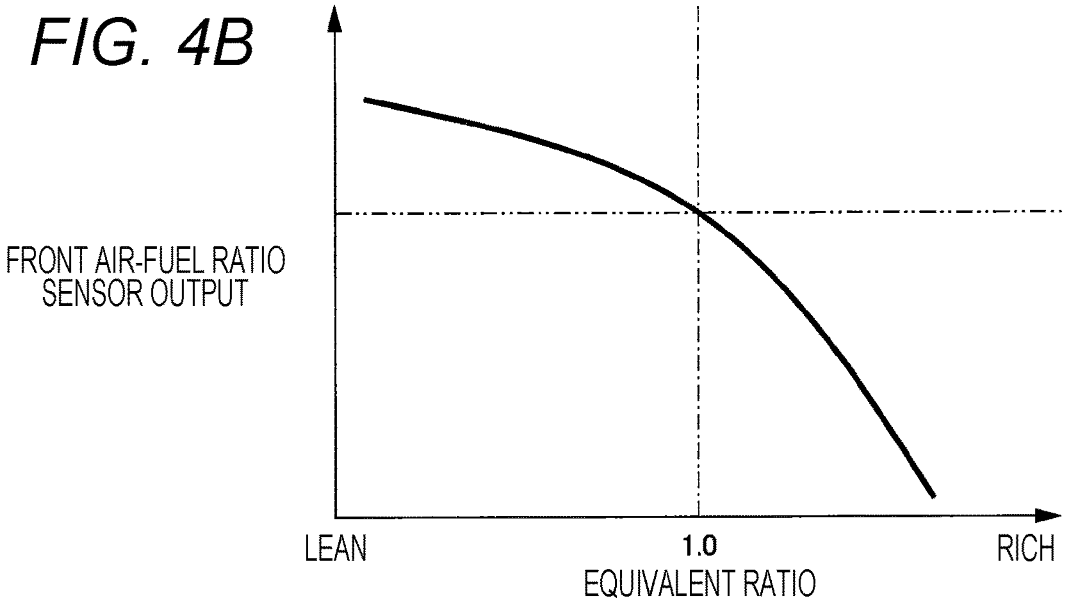
FIG. 4B is a diagram for explaining a relationship between an equivalent ratio of exhaust gas and the output of an air-fuel ratio sensor according to the first embodiment of the present invention.

FIG. 4B is a diagram for explaining a relationship between an equivalent ratio (=theoretical air-fuel ratio/air-fuel ratio) of the exhaust gas and the output of the front air-fuel ratio sensor 20. In FIG. 4B, a horizontal axis represents the equivalent ratio, and a vertical axis represents the output of the front air-fuel ratio sensor 20.

The output (air-fuel ratio sensor output) of the front air-fuel ratio sensor 20 tends to decrease as the equivalent ratio increases (in other words, as the exhaust gas becomes richer,). The ECU 28 can accurately detect the equivalent ratio in a wide range from the lean state to the rich state of the exhaust gas by acquiring in advance the relationship between the "equivalent ratio and the air-fuel ratio sensor output" illustrated in FIG. 4B.

Figure 4C:
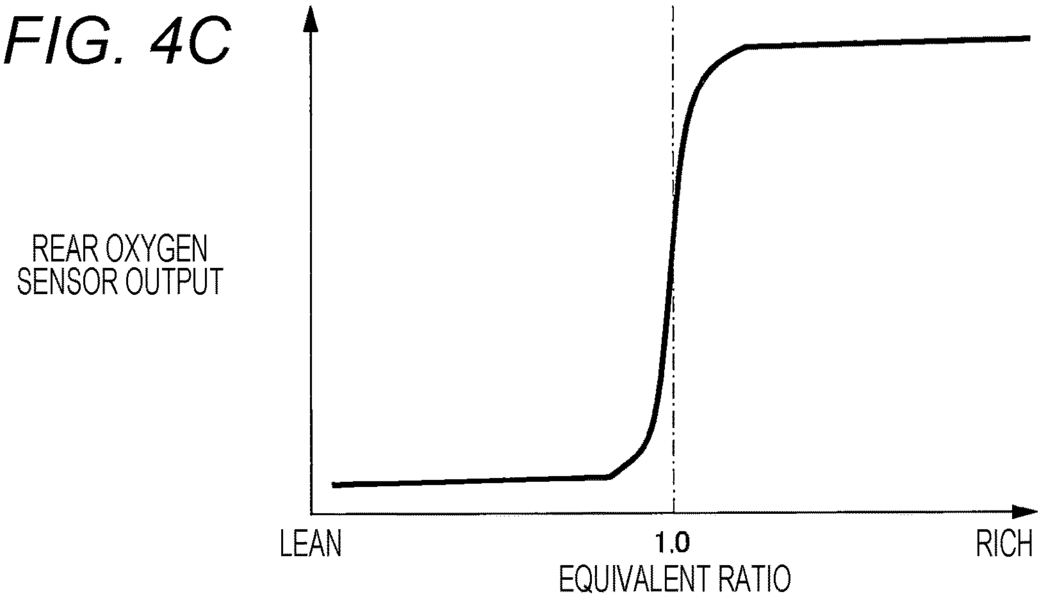
FIG. 4C is a diagram for explaining a relationship between the equivalent ratio of the exhaust gas and the output of a rear oxygen sensor according to the first embodiment of the present invention.

FIG. 4C is a diagram for explaining the relationship between the equivalent ratio of the exhaust gas and the output of the rear oxygen sensor 22. In FIG. 4C, a horizontal axis represents the equivalent ratio, and a vertical axis represents the rear oxygen sensor output.

The rear oxygen sensor output is also read as a rear oxygen sensor voltage, and is changed by an electromotive force associated with a concentration difference between the oxygen concentration contained in the exhaust gas and the oxygen concentration in the air. The rear oxygen sensor output illustrates substantially the minimum electromotive force in the lean condition, and illustrates the maximum electromotive force in the rich condition. Therefore, in the catalyst control, the rear oxygen sensor output has a characteristic of rapidly changing at the theoretical air-fuel ratio (equivalent ratio 1.0). By capturing the change timing of the rear oxygen sensor output and feeding back the change timing to the air-fuel ratio control, the ECU 28 can hold the equivalent ratio of the exhaust gas in the vicinity of the theoretical air-fuel ratio.

<Chemical Species Concentration of Exhaust Gas>

Figure 5A:
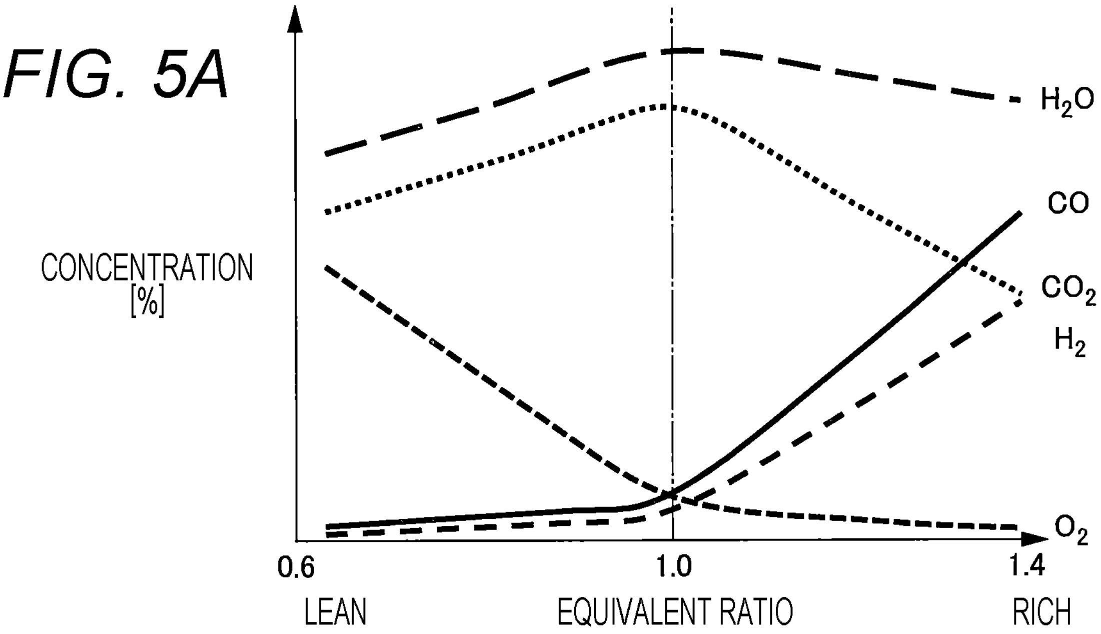
FIG. 5A is a diagram for explaining a tendency with respect to an equivalent ratio of $H_2O$ (water), CO (carbon monoxide), $CO_2$ (carbon dioxide), $H_2$ (hydrogen), and $O_2$ (oxygen) according to the first embodiment of the present invention.
Figure 5B:
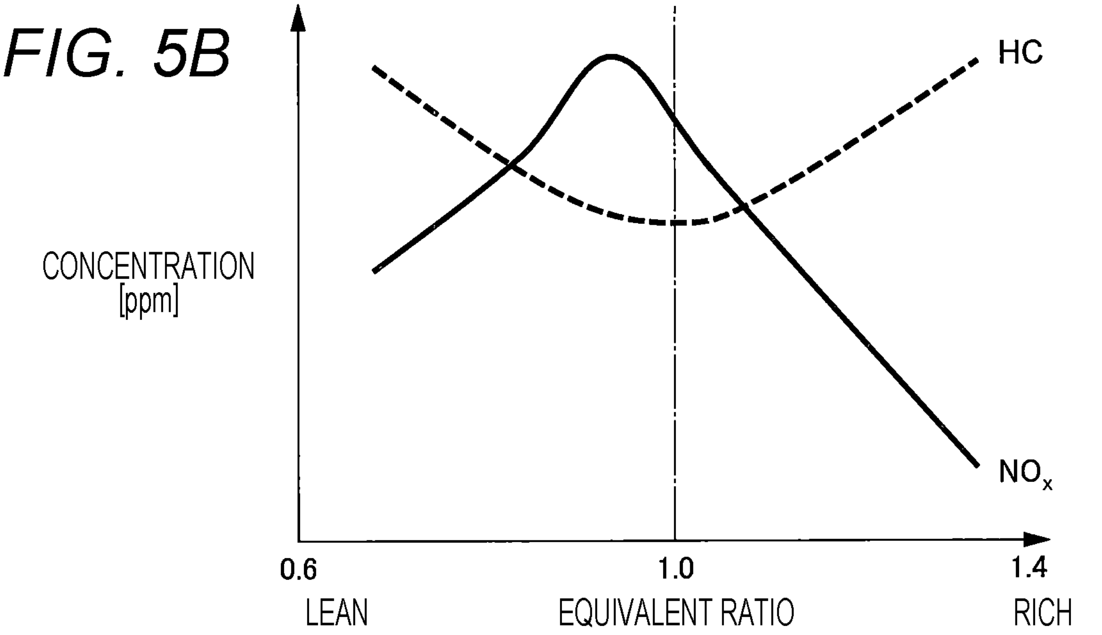
FIG. 5B is a graph for describing a tendency with respect to an equivalent ratio of HC (hydrocarbon) and NOx (nitrogen oxide) according to the first embodiment of the present invention.

FIGS. 5A and 5B are diagrams for explaining the tendency of the chemical species concentration of the exhaust gas with respect to the equivalent ratio.

FIG. 5A is a diagram illustrating a tendency with respect to equivalent ratios of $H_2O$ (water), CO (carbon monoxide), $CO_2$ (carbon dioxide), $H_2$ (hydrogen), and $O_2$ (oxygen).

FIG. 5B is a graph illustrating a tendency with respect to equivalent ratios of HC (hydrocarbon) and NOx (nitrogen oxide). In FIGS. 5A and 5B, a horizontal axis represents the equivalent ratios, and a vertical axis represents the concentration of the chemical species of the exhaust gas.

As illustrated in FIG. 5A, in a combustion gas composition of a hydrocarbon-based fuel, CO (carbon monoxide) and $H_2$ (hydrogen) tend to increase on the rich side and $O_2$ (oxygen) tends to increase on the lean side with the theoretical air-fuel ratio as a boundary. Meanwhile, as illustrated in FIG. 5B, NOx (nitrogen oxide) illustrates a maximum value on a slightly lean side of the theoretical air-fuel ratio, and tends to decrease on the lean side and the rich side.

As illustrated in FIGS. 5A and 5B, even under the theoretical air-fuel ratio condition in which fuel and air (oxygen) are supplied without excess or deficiency, a certain amount of CO (carbon monoxide) or NOx (nitrogen oxide) is discharged without reaching $H_2O$ (water) or $CO_2$ (carbon dioxide) in the high-temperature combustion gas. For this reason, it is necessary to properly purify the exhaust gas by the post-processing system 110.

<Reaction Process of Three-Way Catalyst>

FIG. 6 is a diagram for explaining main reaction processes of a three-way catalyst (ceria system) used in the post-processing system 110. In the reaction process illustrated in FIG. 6, description of coefficients is omitted.

The three-way catalytic reaction process mainly includes an oxidation reaction, an NOx reduction reaction, and an oxygen storage/release reaction. In the oxidation reaction, CO, $H_2$, and HC generated under rich or high temperature conditions react with oxygen to generate harmless $CO_2$ and $H_2O$. Unburned hydrocarbon (HC) contains components such as methane, propane, ethylene, and butane, and the reaction proceeds at different rates.

The NOx reduction reaction is mainly represented by a reaction between CO and NO, and harmless $CO_2$ and $N_2$ are generated.

In the oxygen storage/release reaction, storage/release of oxygen ($O_2$) and each oxidation/reduction reaction of HC, CO, and NO proceed via Ce (cerium) which is a catalyst material. That is, harmless $CO_2$ and $H_2O$ are generated by the reaction of cerium dioxide ($CeO_2$) with CO and HC, and harmless $N_2$ is generated by the reaction of dicerium trioxide ($Ce_2O_3$) with NO. At this time, the oxygen storage ratio $\Psi$ of the three-way catalyst is defined by the balance between $CeO_2$ and $Ce_2O_3$ generated simultaneously. That is, when all of $Ce_2O_3$ in the catalyst becomes $CeO_2$, a reaction with NO cannot be performed, and NO cannot be purified.

As described above, in order to appropriately maintain the purification efficiency of the three-way catalyst, it is necessary to maintain the balance between $CeO_2$ and $Ce_2O_3$, that is, the oxygen storage ratio Y at a predetermined value. Since all the above-described reaction processes strongly depend on the catalyst temperature, the ECU 28 needs to appropriately perform catalyst temperature management so that the temperature becomes equal to or higher than the activation temperature early after the start of the internal combustion engine 1.

In the system illustrated in the present embodiment, a ceria-based three-way catalyst is used, but the present invention is not limited thereto. Even in a catalyst using another material exhibiting a similar effect, the same effect can be exhibited without changing the configuration of the invention by adjusting the constant of the control model. In the catalytic reaction, an aqueous gas shift reaction or the like may be used in addition to the reaction process illustrated in FIG. 6. The ECU 28 can also cope with these reaction processes by adjusting the control model constant.

FIG. 7 is a diagram for explaining the tendency of the purification efficiency of the three-way catalyst with respect to the exhaust gas equivalent ratio at the catalyst activation temperature or higher. In FIG. 7, a horizontal axis represents the equivalent ratio, and a vertical axis represents a catalyst purification rate. FIG. 7 illustrates the catalyst purification rates of NOx, HC, and CO when the equivalent ratio changes from lean to rich. As the catalyst purification efficiency is closer to 100%, the components in the exhaust gas are purified and are not discharged.

This graph illustrates that the purification efficiency characteristic of the three-way catalyst changes with the theoretical air-fuel ratio as a boundary. Under the lean condition, the purification efficiency of co and HC is maintained at approximately 90% or more. Meanwhile, the purification efficiency of NOx decreases as the equivalent ratio decreases. On the rich side, the purification efficiency of HC and co tends to decrease as the equivalent ratio increases. Meanwhile, the purification efficiency of NOx decreases as the equivalent ratio increases. In the vicinity of the theoretical air-fuel ratio, the purification efficiency of any of NOx, HC, and CO can achieve 90% or more. Therefore, a point near the theoretical air-fuel ratio is referred to as a “ternary point”. The ECU 28 performs control to keep the purification efficiency of the three-way catalyst high by keeping the equivalent ratio at the theoretical air-fuel ratio which is the three-way point.

Figure 8:
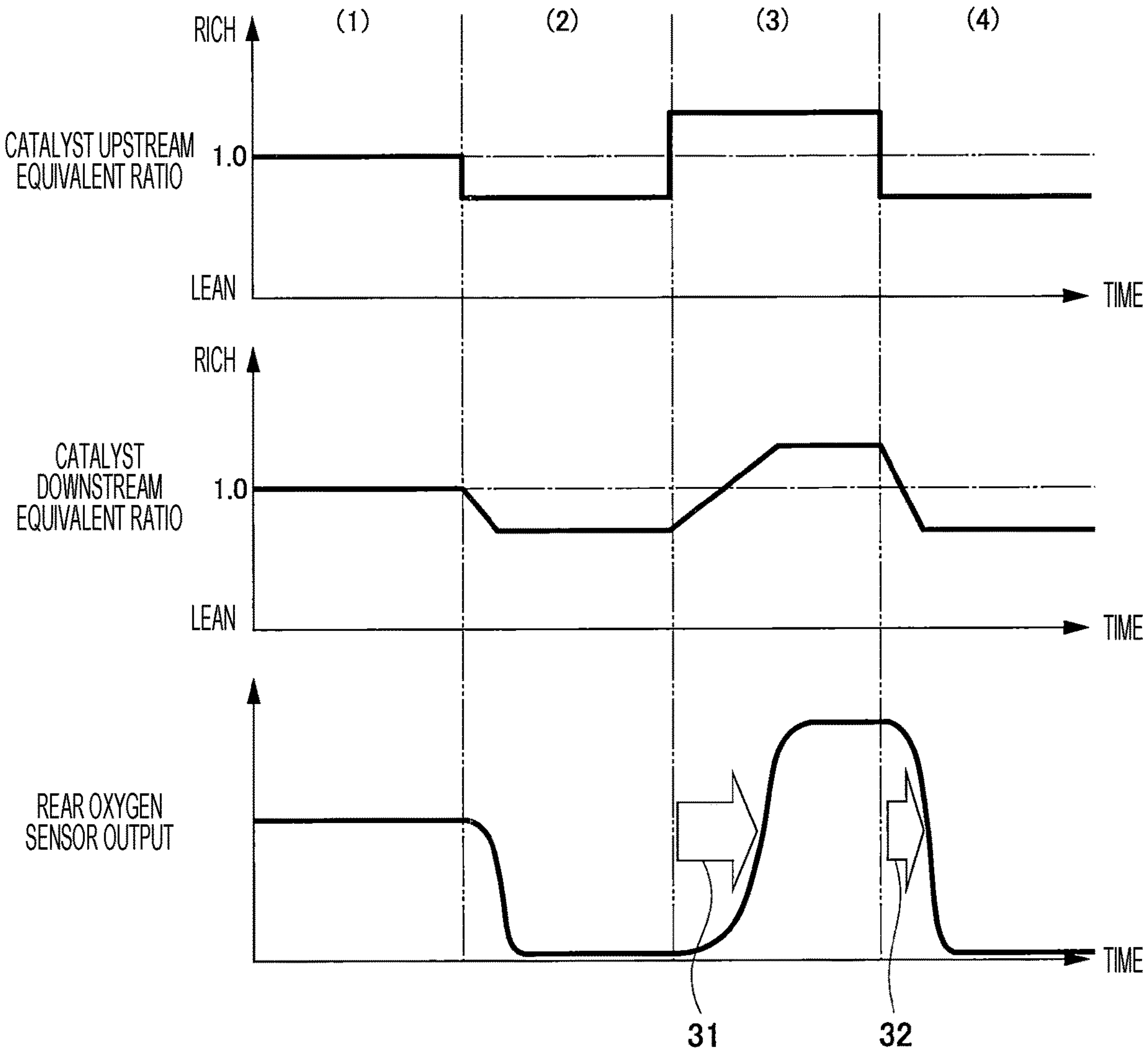
FIG. 8 is a diagram for explaining a catalyst upstream equivalent ratio, a catalyst downstream equivalent ratio, and an output behavior of a rear oxygen sensor 22 according to the first embodiment of the present invention.

FIG. 8 is a diagram for explaining a catalyst upstream equivalent ratio, a catalyst downstream equivalent ratio, and an output behavior of the rear oxygen sensor 22. In FIG. 8, a horizontal axis represents time, and a vertical axis represents the catalyst upstream equivalent ratio, the catalyst downstream equivalent ratio, and the rear oxygen sensor output. Here, the output behavior of the catalyst upstream and downstream equivalent ratios and the rear oxygen sensor 22 installed in the catalyst downstream when the air-fuel ratio is changed stepwise over time to the lean side and the rich side with the equivalent ratio 1.0 as the center is illustrated.

In Step (1) of FIG. 8, the catalyst upstream and downstream equivalent ratio is 1.0, and the output of the rear oxygen sensor 22 is a constant value. Even when the equivalent ratio is set to the theoretical air-fuel ratio, a very small amount of oxygen is discharged downstream of the catalyst, so that the intermediate state is maintained.

In Step (2) of FIG. 8, the catalyst upstream and downstream equivalent ratios decrease to less than 1.0 due to the change to the lean side. Here, the catalyst upstream equivalent ratio immediately decreases, whereas the catalyst downstream equivalent ratio gradually decreases. In addition, the output of the rear oxygen sensor 22 rapidly changes to the minimum value side after the delay period.

In Step (3) of FIG. 8, the catalyst upstream and downstream equivalent ratios increase more than 1.0 due to the change to the rich side. Here, the catalyst upstream equivalent ratio immediately increases, whereas the catalyst downstream equivalent ratio gradually increases with a delay. In addition, the output of the rear oxygen sensor 22 illustrates hysteresis 31 that rapidly changes after a delay larger than the catalyst downstream equivalent ratio.

In Step (4) of FIG. 8, as in Step (2), the catalyst upstream and downstream equivalent ratios decrease to less than 1.0 due to the change to the lean side. Here, the catalyst upstream equivalent ratio immediately decreases, whereas the catalyst downstream equivalent ratio gradually decreases. In addition, the output of the rear oxygen sensor 22 illustrates hysteresis 32 that rapidly changes after a delay larger than the catalyst downstream equivalent ratio.

As described above, in the change from lean to rich and the change from rich to lean, the delay time of the catalyst downstream equivalent ratio and the delay time of the output of the rear oxygen sensor 22 tend to be different. This tendency is caused by a difference in a reaction rate between $CeO_2$ and $Ce_2O_3$ of the three-way catalyst described in FIG. 6. In addition, since the reaction rate depends on the catalyst temperature and the exhaust gas flow rate, the hysteresis properties 31 and 32 also change depending on the catalyst temperature and the exhaust gas flow rate.

Figure 9:
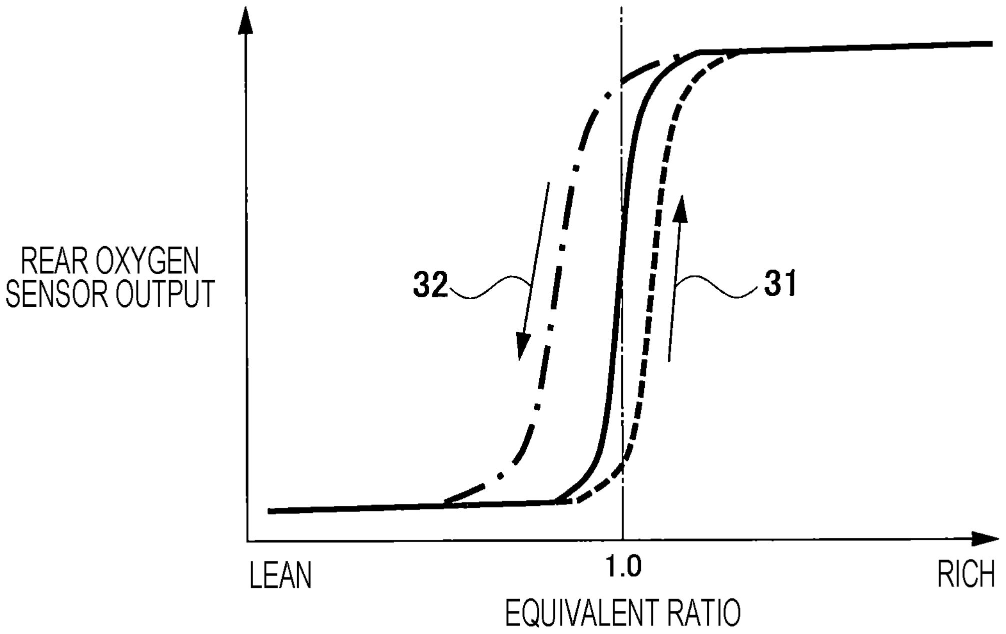
FIG. 9 is a diagram for explaining hysteresis of output characteristics of the rear oxygen sensor according to the first embodiment of the present invention.

FIG. 9 is a diagram for explaining hysteresis of output characteristics of the rear oxygen sensor 22. In this graph, a horizontal axis represents the equivalent ratio, and a vertical axis represents the output of the rear oxygen sensor 22.

The static characteristics of the rear oxygen sensor 22 are as described with reference to FIG. 4C. Meanwhile, since the rear oxygen sensor 22 itself uses a catalyst material, it has hysteresis due to detection delay of oxygen. That is, when the lean state rapidly changes to the rich state, the equivalent ratio of the change timing of the sensor output shifts to the rich side. Meanwhile, when the rich state rapidly changes to the lean state, the equivalent ratio of the change timing of the sensor output shifts to the lean side.

Furthermore, the behavior of the rear oxygen sensor 22 described above is affected by characteristic degradation and temperature of the material constituting the rear oxygen sensor 22. For example, the output of the rear oxygen sensor is delayed due to aging of the rear oxygen sensor 22. In the control model, it is necessary to consider not only the deterioration of the catalyst but also a change in dynamic characteristics including the influence of the deterioration of the rear oxygen sensor 22 and the temperature.

Figure 10:
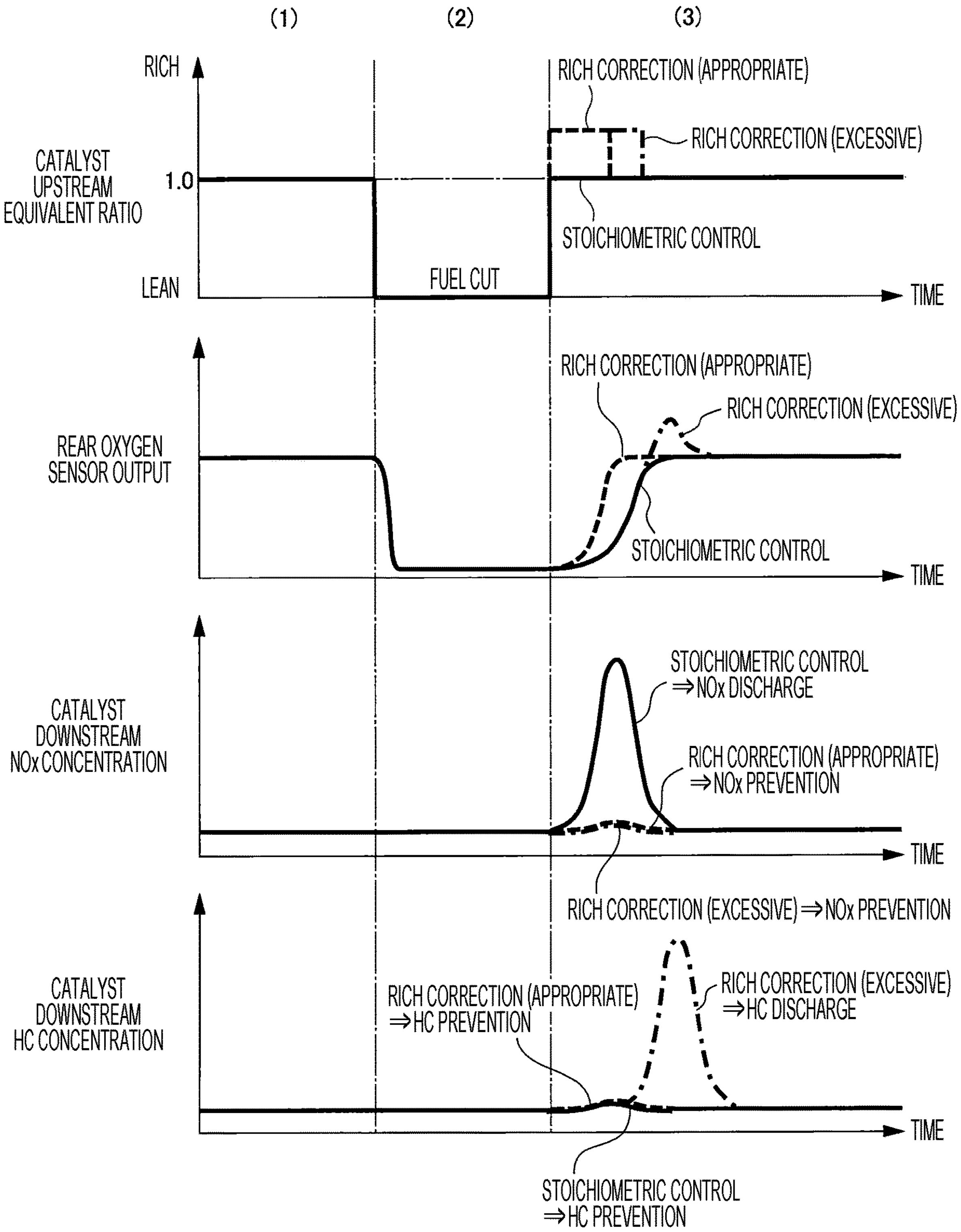
FIG. 10 is a graph for explaining the output of the rear oxygen sensor according to the first embodiment of the present invention and temporal changes in NOx concentration and HC concentration downstream of the catalyst.

FIG. 10 is a diagram for explaining the output of the rear oxygen sensor 22 and temporal changes in the NOx concentration and the HC concentration downstream of the catalyst. In FIG. 10, the horizontal axis represents time, and the vertical axis represents the catalyst upstream equivalent ratio, the rear oxygen sensor output, the catalyst downstream NOx concentration, and the catalyst downstream HC concentration. FIG. 10 illustrates temporal changes of the output of the rear oxygen sensor 22 and the NOx concentration and the HC concentration downstream of the catalyst in a case where the control is performed at the theoretical air-fuel ratio, a motoring operation (fuel cut) period, and a firing operation (internal combustion engine operation) is performed again at the theoretical air-fuel ratio.

In Step (1) of FIG. 10, the catalyst upstream equivalent ratio is 1.0, and the output of the rear oxygen sensor 22 is a constant value. In addition, the NOx concentration and the HC concentration downstream of the catalyst are low.

In Step (2) of FIG. 10, since the fuel cut is performed, the output of the rear oxygen sensor 22 decreases, and the catalyst upstream and downstream equivalent ratios decrease to be lower than 1.0. As illustrated in FIG. 5B, the NOx concentration is low in the lean state. In addition, as illustrated in FIG. 7, in the lean state, since the catalyst purification rate of HC is high, the HC concentration decreases.

In Step (3) of FIG. 10, the firing operation using the theoretical air-fuel ratio is started again. Here, temporal changes in the output of the rear oxygen sensor 22 and the NOx concentration and the HC concentration downstream of the catalyst will be described in the order of the stoichiometric control, the appropriate rich correction, and the excessive rich correction.

(Stoichiometric Control)

The temporal changes of the output of the rear oxygen sensor 22 and the NOx concentration and the HC concentration downstream of the catalyst when the stoichiometric control is performed are indicated by solid lines. As illustrated in FIG. 8, the output of the rear oxygen sensor 22 increases with a delay with respect to the change from the lean state to the rich state. The NOx concentration downstream of the catalyst indicates a behavior in which momentarily increased NOx is discharged during a delay period until the output of the rear oxygen sensor 22 returns. Meanwhile, since the HC concentration downstream of the catalyst is substantially unchanged, HC is prevented from being discharged.

(Appropriate Rich Correction)

The output of the rear oxygen sensor 22 and the temporal changes of the NOx concentration and the HC concentration downstream of the catalyst when the appropriate rich correction is performed are indicated by broken lines. When the firing operation is started again after the fuel cut, once the rich correction is performed, the catalyst upstream equivalent ratio becomes rich. The output of the rear oxygen sensor 22 reaches the equivalent ratio earlier than the stoichiometric control. In addition, since the NOx concentration and the HC concentration in the downstream of the catalyst are substantially unchanged, NOx and HC are prevented from being discharged.

(Excessive Rich Correction)

The temporal change of the output of the rear oxygen sensor 22 and the NOx concentration and the HC concentration downstream of the catalyst when the excessive rich correction is performed is indicated by a rough broken line. The rear oxygen sensor 22 detects the oxygen state of the downstream gas of the catalyst. Therefore, when excessive rich correction is performed, the internal state of the catalyst has already changed to a state where the oxygen storage state is maximized or minimized at the time when the output of the rear oxygen sensor 22 reacts. When the excessive rich correction is performed, the NOX concentration decreases as illustrated in FIG. 5B, and the catalyst purification rate of NOx increases as illustrated in FIG. 7, so that NOx emission is prevented.

Meanwhile, since the HC concentration increases as illustrated in FIG. 5B and the catalyst purification rate of HC decreases as illustrated in FIG. 7, HC is discharged. That is, when the control method of stopping the rich correction after the output of the rear oxygen sensor 22 reacts is adopted, HC cannot be appropriately prevented because the stop timing of the rich correction is too late for the catalyst. Therefore, in the air-fuel ratio control of the internal combustion engine, it is necessary to perform rich correction control for an appropriate period in consideration of the state inside the catalyst that cannot be directly observed from the outside.

Figure 11:
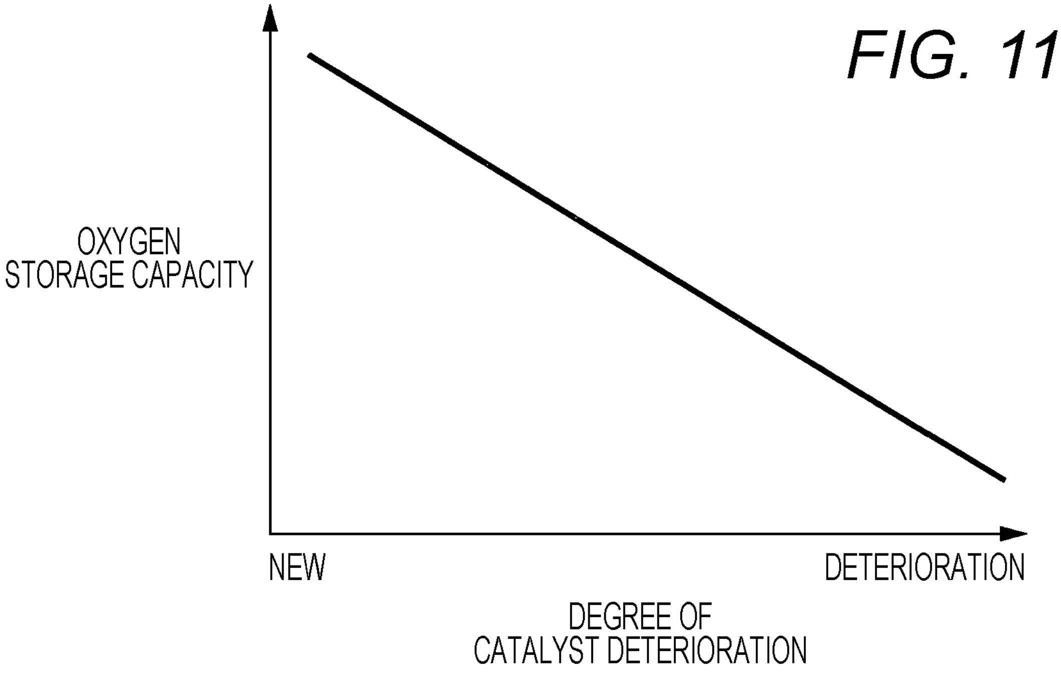
FIG. 11 is a diagram for explaining a relationship between a degree of catalyst deterioration and an oxygen storage capacity of the three-way catalyst according to the first embodiment of the present invention.

FIG. 11 is a diagram for explaining a relationship between a degree of the catalyst deterioration and the oxygen storage capacity of the three-way catalyst. In FIG. 11, a horizontal axis represents the degree of catalyst deterioration, and the vertical axis represents the oxygen storage capacity.

The catalyst deterioration refers to a state in which the catalytic action of the three-way catalyst is reduced due to the thermal influence or the influence of poisoning by sulfur contained in the fuel. When the three-way catalyst is new, the oxygen storage capacity of the three-way catalyst is high. However, as the catalyst deterioration progresses, the oxygen storage capacity of the three-way catalyst tends to decrease.

Hereinafter, the influence of the change in oxygen storage capacity on the purification action of the three-way catalyst will be described.

Figure 12:
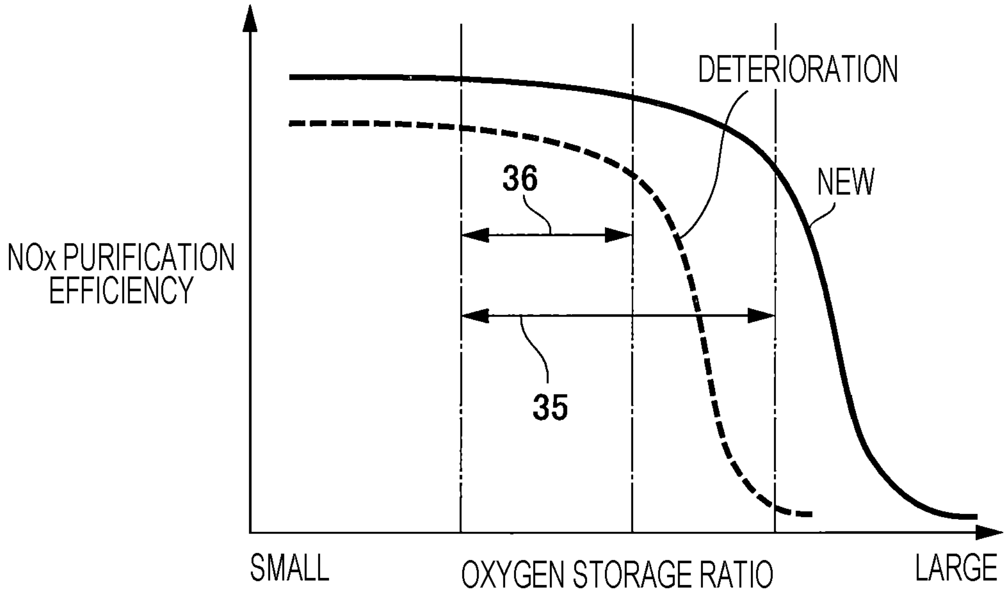
FIG. 12 is a diagram for explaining a relationship between an oxygen storage ratio of the three-way catalyst and NOx purification of the three-way catalyst according to the first embodiment of the present invention.

FIG. 12 is a diagram for explaining a relationship between the oxygen storage ratio of the three-way catalyst and the NOx purification efficiency of the three-way catalyst. In FIG. 12, a horizontal axis represents the oxygen storage ratio, and a vertical axis represents the NOx purification efficiency. In FIG. 12, the change in the NOx purification efficiency of the new three-way catalyst is represented by a solid line, and the change in the NOx purification efficiency of the deteriorated three-way catalyst is represented by a broken line.

When the oxygen storage ratio is small, both the new three-way catalyst and the deteriorated three-way catalyst have a high oxygen storage ratio. In addition, the new three-way catalyst has a higher NOx purification efficiency than the deteriorated three-way catalyst.

When the oxygen storage ratio exceeds a predetermined value, the NOx purification efficiency of both the new three-way catalyst and the deteriorated three-way catalyst is significantly reduced. This is because, as described with reference to FIG. 6, $Ce_2O_3$ in the catalyst is important for NOx purification, and when all of $Ce_2O_3$ reacts and changes to $CeO_2$, $Ce_2O_3$ cannot react with NO, and NO is not purified. Therefore, as described with reference to FIG. 7, in order to keep the catalyst purification efficiency of the three-way catalyst high, it is necessary not only to keep the exhaust gas air-fuel ratio at the catalyst inlet at the three-way point but also to appropriately correct and control the exhaust gas air-fuel ratio at the catalyst inlet so that the oxygen storage ratio falls within a predetermined range. As illustrated in FIG. 12, as the predetermined range of the oxygen storage ratio, when the catalyst deteriorates is expressed as a control range at the time of deterioration 36, when the catalyst is new is expressed as a control range at the time of a new catalyst 35, and the control range at the time of the new catalyst 35 is wider than the control range at the time of deterioration 36.

Figure 13:
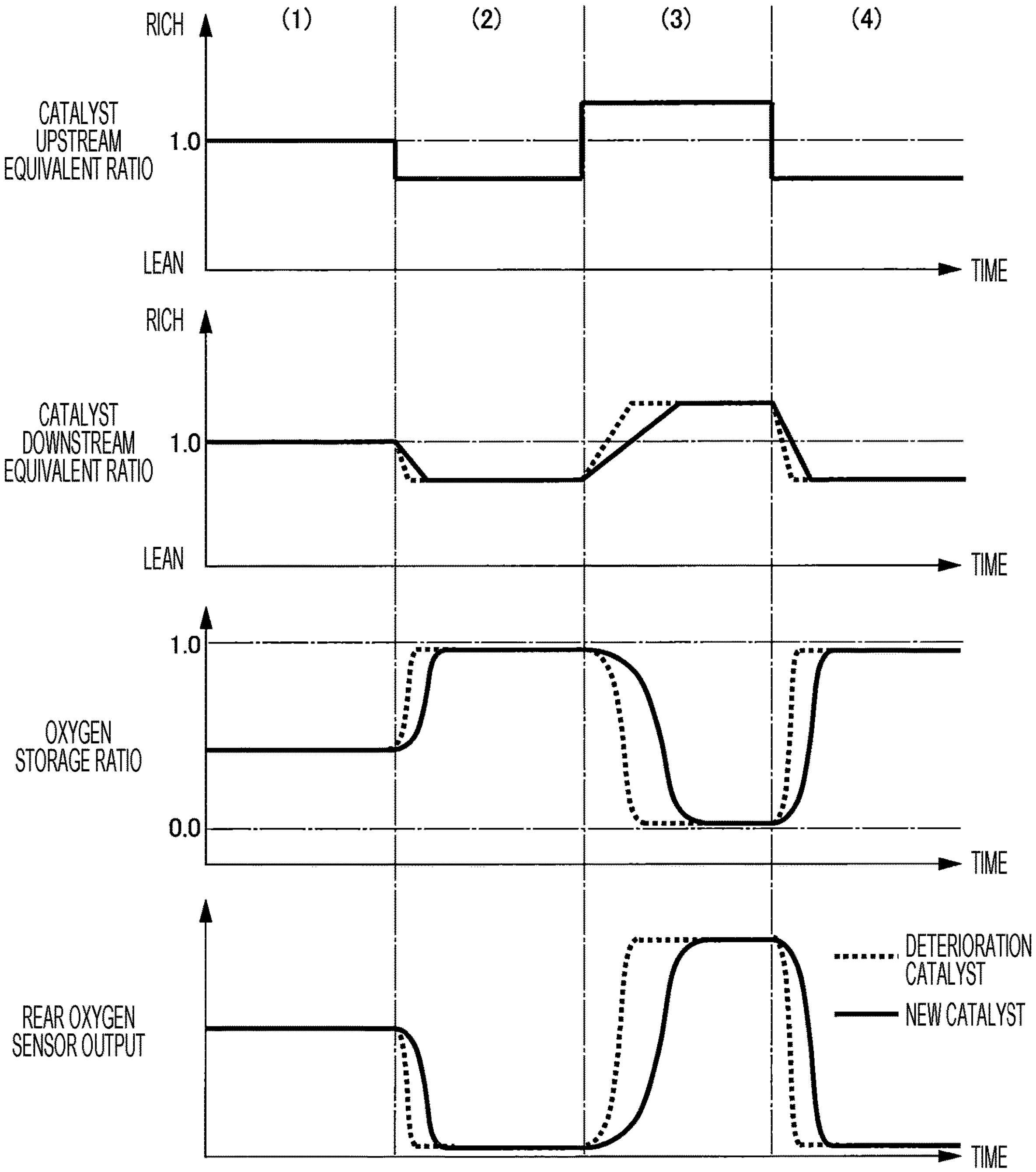
FIG. 13 is a diagram for explaining a comparison result of the catalyst upstream equivalent ratio, the catalyst downstream equivalent ratio, the oxygen storage ratio, and the output behavior of the rear oxygen sensor in the case of using a new catalyst and a deterioration catalyst according to the first embodiment of the present invention.

FIG. 13 is a diagram for explaining the comparison result of the catalyst upstream equivalent ratio, the catalyst downstream equivalent ratio, the oxygen storage ratio, and the output behavior of the rear oxygen sensor 22 when the new catalyst and the deterioration catalyst are used. In FIG. 13, a horizontal axis represents time, and a vertical axis represents the catalyst upstream equivalent ratio, the catalyst downstream equivalent ratio, the oxygen storage ratio, and the rear oxygen sensor output. FIG. 13 illustrates the output behavior of the rear oxygen sensor 22 installed downstream of the catalyst when the air-fuel ratio is temporally stepwise changed to the lean side and the rich side around the equivalent ratio of 1.0 when the new catalyst and the deterioration catalyst are used. A broken line graph in the drawing represents a deterioration catalyst, and a solid line graph represents a new catalyst.

In Step (1) of FIG. 13, the catalyst upstream and downstream equivalent ratios are 1.0, and the output of the rear oxygen sensor 22 is a constant value. Even when the equivalent ratio is set to the theoretical air-fuel ratio, a very small amount of oxygen is discharged downstream of the catalyst, so that the intermediate state is maintained.

In Step (2) of FIG. 13, the catalyst upstream and downstream equivalent ratios decrease to less than 1.0 due to the change to the lean side. Here, the catalyst upstream equivalent ratio immediately decreases, whereas the catalyst downstream equivalent ratio gradually decreases. In addition, since the oxygen storage amount of the new catalyst is large, the change in the catalyst downstream equivalent ratio of the new catalyst is delayed from the change in the catalyst downstream equivalent ratio of the deterioration catalyst. In addition, since the oxygen storage amount of the deterioration catalyst is small, the oxygen storage ratio of the deterioration catalyst is immediately saturated, whereas it takes time until the oxygen storage ratio of the new catalyst s saturated. Therefore, the output of the rear oxygen sensor 22 changes faster in the deterioration catalyst than in the new catalyst.

In Step (3) of FIG. 13, the catalyst upstream and downstream equivalent ratios increase more than 1.0 due to the change to the rich side. Here, the catalyst upstream equivalent ratio immediately increases, whereas the catalyst downstream equivalent ratio gradually increases with a delay. The change in the equivalent ratio of the new catalyst is delayed from the change in the equivalent ratio of the deterioration catalyst.

In Step (4) of FIG. 13, as in Step (2), the catalyst upstream and downstream equivalent ratios decrease to less than 1.0 due to the change to the lean side. Here, the catalyst upstream equivalent ratio immediately decreases, whereas the catalyst downstream equivalent ratio gradually decreases. In addition, regarding the oxygen storage ratio and the output of the rear oxygen sensor 22, the change in the new catalyst is delayed from the change in the deterioration catalyst.

As illustrated in FIG. 13, in the deterioration catalyst, the delay of the output behavior of the rear oxygen sensor 22 with respect to the lean change and the rich change of the air-fuel ratio is reduced as compared with the new catalyst. This can be explained by the temporal transition of the oxygen storage ratio of the catalyst. That is, since the oxygen storage capacity of the catalyst decreases due to deterioration, the oxygen storage ratio reaches the maximum value or the minimum value more quickly, the oxygen release behavior to the downstream of the catalyst is accelerated, and the delay in the output behavior of the rear oxygen sensor 22 is reduced. Therefore, the rich correction period after recovery from the fuel cut described with reference to FIG. 10 needs to be set in consideration of the deterioration state of the catalyst.

Figure 14A:
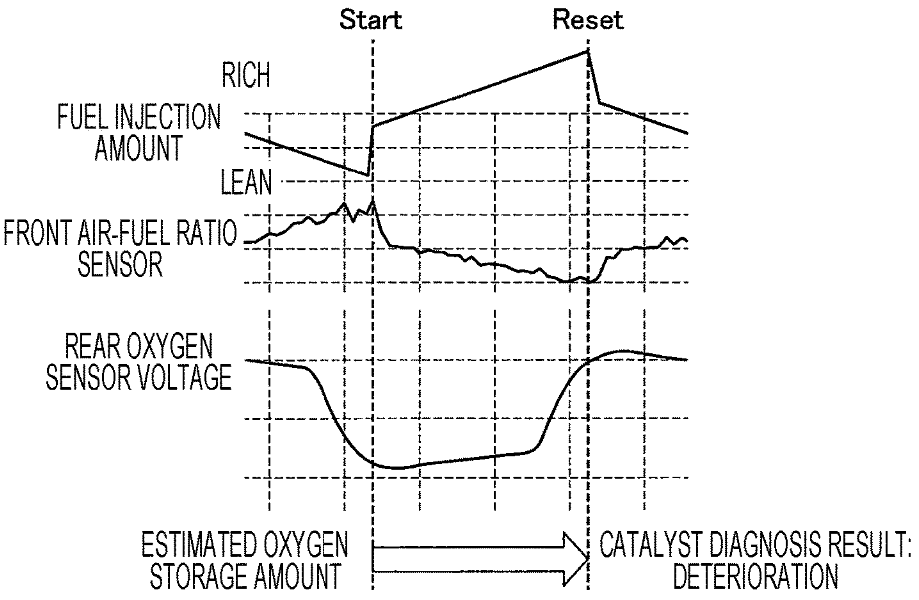
FIG. 14A is a diagram illustrating a change in a sensor voltage which is an output of the rear oxygen sensor when the rear oxygen sensor according to the first embodiment of the present invention is in a new state.
Figure 14B:
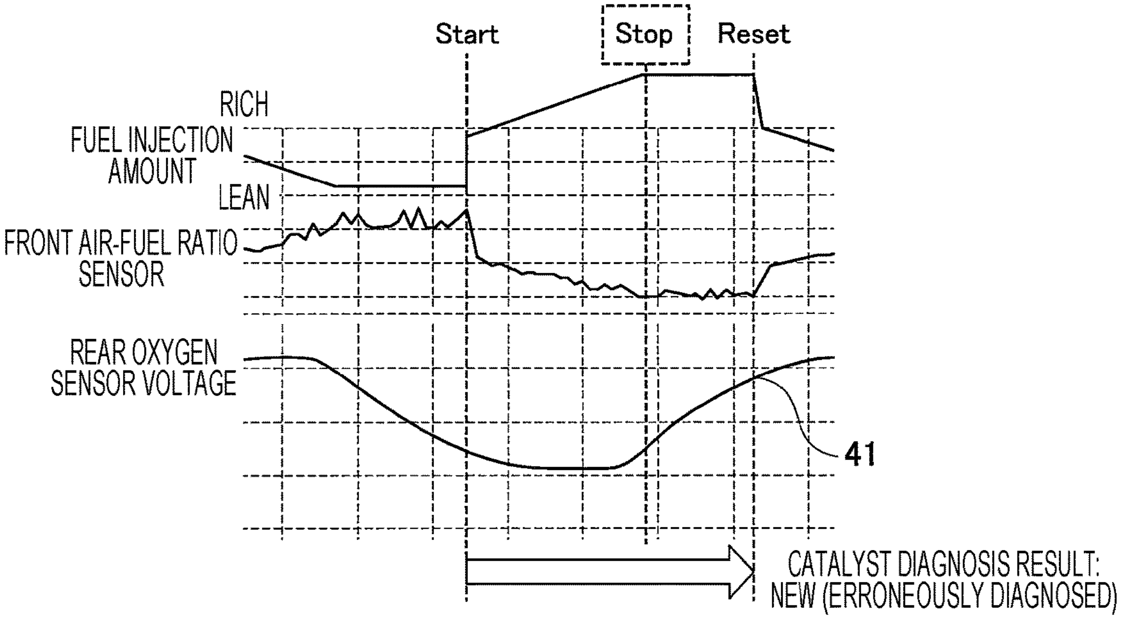
FIG. 14B is a diagram illustrating a change in a sensor voltage, which is an output of the rear oxygen sensor, when the rear oxygen sensor according to the first embodiment of the present invention is in a deterioration state.

FIGS. 14A and 14B are explanatory diagrams illustrating the influence of the deterioration of the rear oxygen sensor 22 on the catalyst diagnosis.

In the estimated oxygen storage amount of the deterioration catalyst, the time when the air-fuel ratio is switched from lean to rich is set as the integration start (Start position in the drawings) of the oxygen storage amount, and the time (Reset position in the drawings) when the air-fuel ratio is switched from lean to rich is set as the integration stop of the oxygen storage amount.

FIG. 14A is a diagram illustrating a change in the rear oxygen sensor voltage when the rear oxygen sensor 22 is in a new state. The rear oxygen sensor 22 outputs the rear oxygen sensor voltage corresponding to the catalyst deterioration state, and the rear oxygen sensor voltage returns to the original value at the Reset position, so that the catalyst diagnosis is correctly performed.

FIG. 14B is a diagram illustrating a change in the rear oxygen sensor voltage when the rear oxygen sensor 22 is in a deterioration state. In the rear oxygen sensor 22, the rise of the rear oxygen sensor voltage is delayed. For this reason, originally, the Reset position illustrated in FIG. 14A needs to be set as the integration stop timing of the oxygen storage amount, but as illustrated in a delay 41 due to sensor deterioration in FIG. 14B, the rear oxygen sensor voltage returns to the original value at the Reset position delayed from the Stop position. Therefore, the integration stop time of the oxygen storage is delayed, and an excessive oxygen storage amount is calculated. As a result, it is determined that the catalyst diagnosis can store a large amount of oxygen although the catalyst is in a deterioration state, and it is erroneously diagnosed that the catalyst is in a new state.

Figure 15:
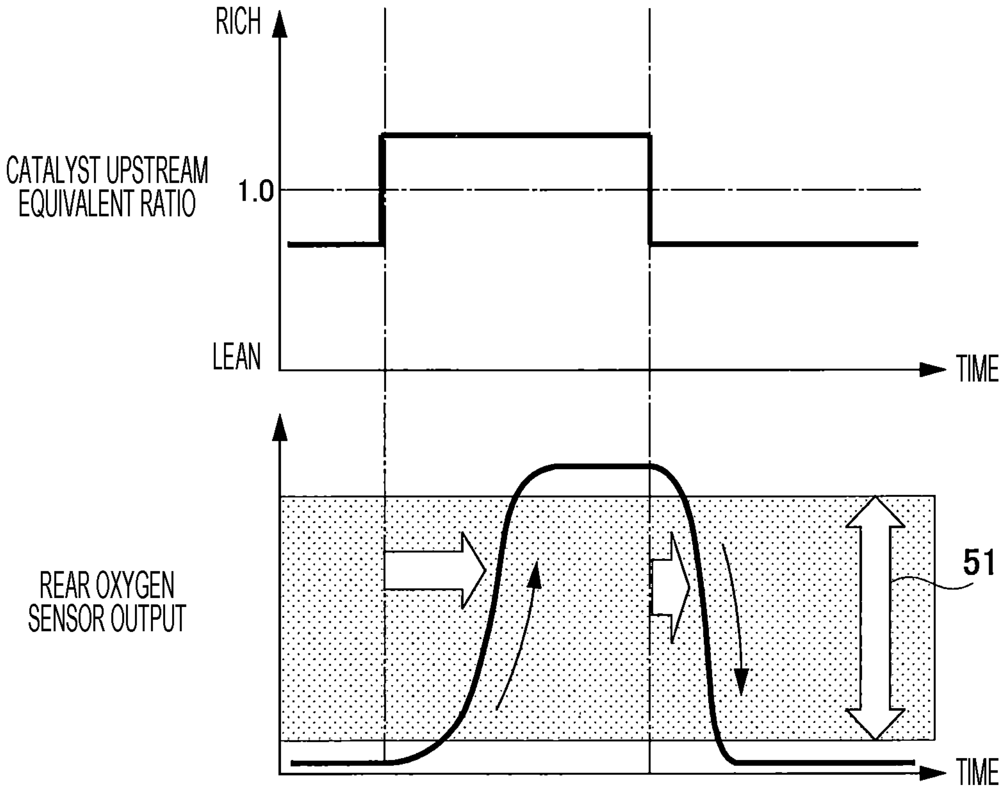
FIG. 15 is a diagram for describing a method of excluding a delay of a sensor voltage of a rear oxygen sensor which is in a deterioration state according to the first embodiment of the present invention.

FIG. 15 is a diagram for describing a method of excluding the delay of the rear oxygen sensor voltage in the deterioration state. In FIG. 15, a horizontal axis represents time, and a vertical axis represents the catalyst upstream equivalent ratio and the rear oxygen sensor output. FIG. 15 illustrates a method of excluding a delay in the rear oxygen sensor voltage output from the rear oxygen sensor 22 in the deterioration state by using the hysteresis characteristic of the rear oxygen sensor 22.

The catalyst upstream equivalent ratio is illustrated on the upper side of FIG. 15, and a change state of the rear oxygen sensor voltage is illustrated as a rear oxygen sensor output on the lower side of FIG. 15. The rear oxygen sensor 22 has a switch-like nonlinear characteristic in which the output of the rear oxygen sensor voltage is delayed (hysteresis). For example, as indicated by the catalyst upstream equivalent ratio on the upper side of FIG. 15, when the lean changes to the rich or the rich changes to the lean, the rear oxygen sensor output changes with a delay.

When the rear oxygen sensor output enters a band 51 represented by the range of the double-headed arrow in FIG. 15, the value of the rear oxygen sensor output is inverted at once. The integration stop determination unit 120 (see FIG. 3) of the ECU 28 according to the present embodiment has a function of determining the integration stop position, and grasps the rising timing of the rear oxygen sensor voltage using the characteristic of reversing when the rear oxygen sensor output enters the band 51.

<Timing of Starting and Stopping Integration of Oxygen Storage Amount>

The oxygen storage amount integration unit (oxygen storage amount integration unit 133) of the ECU 28 sets the timing at which a signal is input from the integration stop determination unit (integration stop determination unit 120) as the integration stop position when the voltage value output from the oxygen concentration sensor (rear oxygen sensor 22) falls within the range of the voltage upper limit threshold and the voltage lower limit threshold and the differential value of the voltage value exceeds the differential value threshold. For example, the oxygen storage amount integration unit 133 performs a process of stopping the integration of the oxygen storage amount when the rear oxygen sensor voltage falls within the threshold of the band 51 and a time differential value of the sensor voltage value reaches or exceeds a certain threshold. Therefore, timings of starting and stopping the integration of the oxygen storage amount will be described with reference to FIGS. 16 and 17.

Figure 16:
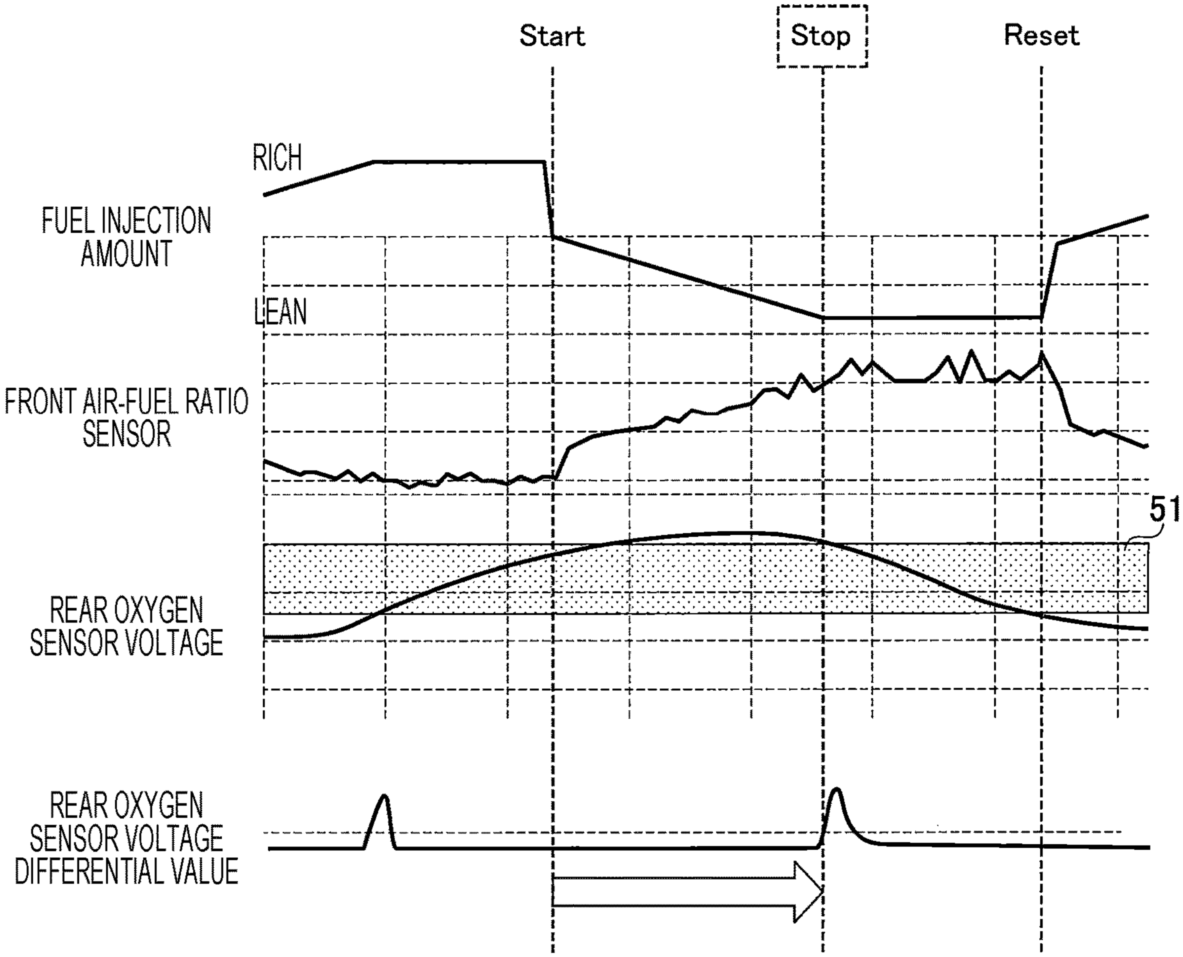
FIG. 16 is an explanatory diagram illustrating an example of timings of starting and stopping the integration of the oxygen storage amount when a fuel injection amount decreases (rich to lean) according to the first embodiment of the present invention.

FIG. 16 is an explanatory diagram illustrating an example of timings of starting and stopping the integration of the oxygen storage amount when the fuel injection amount decreases (rich to lean).

As illustrated in FIGS. 14A and 14B, the voltage rising timing of the rear oxygen sensor 22 is not affected by the deterioration of the rear oxygen sensor 22. Therefore, the integration stop determination unit 120 of the ECU 28 can accurately grasp the timing of stopping the oxygen storage amount integration by accurately grasping the voltage rising timing of the rear oxygen sensor 22. Therefore, the moment when the AND condition satisfying that the rear oxygen sensor voltage falls within the range of the predetermined value (band 51) and the differential value of the rear oxygen sensor voltage is equal to or greater than a certain threshold is satisfied is set as the stop timing of the oxygen storage amount integration.

In addition, the voltage value determination unit 122 of the integration stop determination unit 120 detects the rising timing of the rear oxygen sensor voltage by capturing that the rear oxygen sensor 22 has entered the predetermined value range (band 51). Further, the differential value determination unit 121 of the integration stop determination unit 120 detects the rising timing of the differential value by detecting that the differential value of the sensor voltage is equal to or more than the threshold.

In FIG. 16, the time point (Start) at which the fuel injection amount decreases represents the timing at which the integration of the oxygen storage amount is started. FIG. 16 illustrates a timing at which the integration of the oxygen storage amount is stopped at a time point (Stop) when the rear oxygen sensor voltage increases and comes out of the predetermined value range (band 51) and then the inverted rear oxygen sensor voltage decreases and enters the predetermined value range (band 51).

At a time point (Stop) when the rear oxygen sensor voltage falls within the predetermined value range (band 51), the differential value of the rear oxygen sensor voltage takes a negative value, but is converted into an absolute value by the determination unit 121*b*. Since the differential value and the differential value threshold of the rear oxygen sensor voltage are converted into absolute values, the determination unit 121*b* can easily compare the differential value of the rear oxygen sensor voltage with the differential value threshold. Therefore, the differential value determination unit 121 can grasp the timing at which the differential value exceeds the differential value threshold as the timing at which the rear oxygen sensor voltage enters the range of the predetermined value (band 51).

Then, the oxygen storage amount integration unit 133 starts the integration of the oxygen storage amount from the Start position where the rich state changes to the lean state, and stops the integration at the Stop position. The catalyst deterioration diagnosis unit 134 diagnoses whether the catalyst deteriorates based on the estimated oxygen storage amount obtained by the oxygen storage amount integration unit 133.

Figure 17:
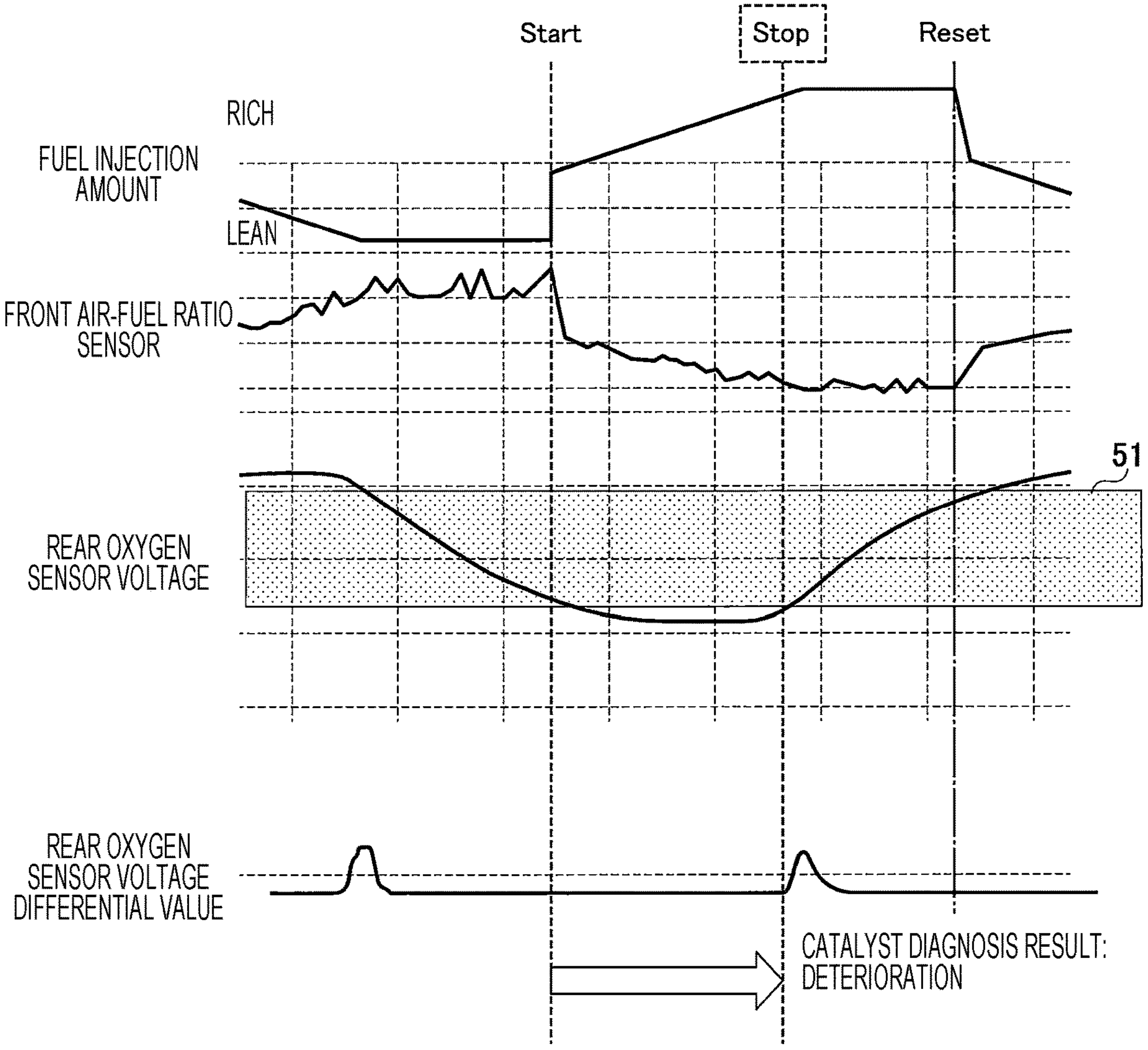
FIG. 17 is an explanatory diagram illustrating an example of timings of starting and stopping the integration of the oxygen storage amount when the fuel injection amount decreases (lean to rich) according to the first embodiment of the present invention.

FIG. 17 is an explanatory diagram illustrating an example of timings of starting and stopping the integration of the oxygen storage amount when the fuel injection amount decreases (lean to rich).

In FIG. 17, the time point (Start) at which the fuel injection amount increases represents the timing at which the integration of the oxygen storage amount is started. FIG. 17 illustrates a timing at which the integration of the oxygen storage amount is stopped at a time point (Stop) when the rear oxygen sensor voltage decreases and comes out of the predetermined value range (band 51) and then the inverted rear oxygen sensor voltage increases and enters the predetermined value range (band 51). At a time point (Stop) when the rear oxygen sensor voltage falls within the predetermined value range (band 51), the differential value of the rear oxygen sensor voltage takes a positive value. Therefore, the integration stop determination unit 120 can grasp the timing at which the differential value exceeds the differential value threshold as the timing at which the rear oxygen sensor voltage enters the range of the predetermined value (band 51).

Then, the oxygen storage amount integration unit 133 starts the integration of the oxygen storage amount from the Start position that changes from lean to rich, and stops the integration at the Stop position. The catalyst deterioration diagnosis unit 134 diagnoses whether the catalyst deteriorates based on the estimated oxygen storage amount obtained by the oxygen storage amount integration unit 133.

Figure 18:
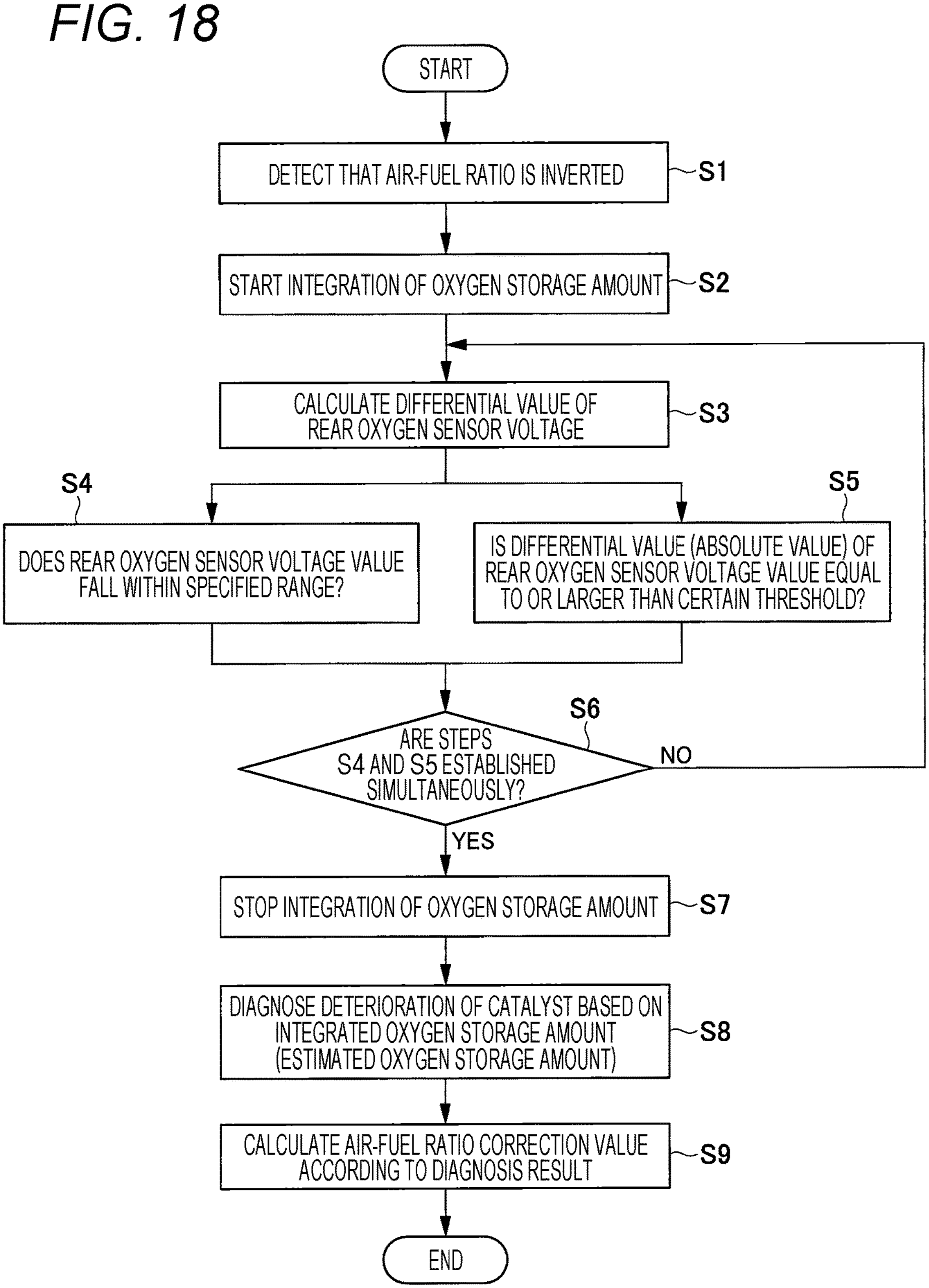
FIG. 18 is a flowchart for stopping the integration of the oxygen storage amount according to the first embodiment of the present invention.

FIG. 18 is a flowchart for stopping the integration of the oxygen storage amount. The integration of the oxygen storage amount is stopped when the rear oxygen sensor voltage falls within the threshold of the band 51 and the time differential value of the rear oxygen sensor voltage becomes equal to or larger than a certain differential value threshold. Here, processing of each functional unit will be described with reference to FIG. 3.

First, the integration start determination unit 132 detects that the air-fuel ratio is inverted based on the air-fuel ratio sensor signal (S1). The reversal of the air-fuel ratio means that the combustion gas of the internal combustion engine starts to change from lean to rich or from rich to lean. At this time, the oxygen flow rate estimation unit 131 estimates the oxygen flow rate based on the air-fuel ratio sensor signal and the exhaust gas flow rate. Then, the oxygen storage amount integration unit 133 starts integration of the oxygen storage amount (S2).

Next, the differentiator 121*a* of the differential value determination unit 121 calculates a differential value of the rear oxygen sensor voltage based on the rear oxygen sensor signal input from the rear oxygen sensor 22 (S3). Next, based on the rear oxygen sensor signal input from the rear oxygen sensor 22, the voltage value determination unit 122 checks whether the rear oxygen sensor voltage falls within a specified range (within the range of the voltage lower limit threshold and the voltage upper limit threshold) (S4). In parallel with Step S4, the differential value determination unit 121 checks whether the differential value (absolute value) of the rear oxygen sensor voltage is equal to or larger than a certain differential value threshold (S5).

Next, the integration stop determination unit 120 determines whether Steps S4 and S5 are established simultaneously (S6). When Steps S4 and S5 are not established at the same time (NO in S6), the processing returns to Step S3 again, and the processing is repeated. When Steps S4 and S5 are simultaneously established (YES in S6), the integration stop determination unit 120 outputs an integration stop signal to the oxygen storage amount integration unit 133.

When the integration stop signal is input, the oxygen storage amount integration unit 133 stops the integration of the oxygen storage amount (S7). Thereafter, the oxygen storage amount integration unit 133 outputs the integrated oxygen storage amount to the catalyst deterioration diagnosis unit 134 as the estimated oxygen storage amount. The catalyst deterioration diagnosis unit 134 performs a deterioration diagnosis of the catalyst based on the estimated oxygen storage amount (S8), and outputs a diagnosis result to the air-fuel ratio correction unit 135.

Then, the air-fuel ratio correction unit 135 calculates an air-fuel ratio correction value according to the diagnosis result with respect to the input air-fuel ratio target value (S9), and ends this processing. The air-fuel ratio correction unit 135 outputs the corrected target air-fuel ratio based on the calculated air-fuel ratio correction value.

Figure 19A:
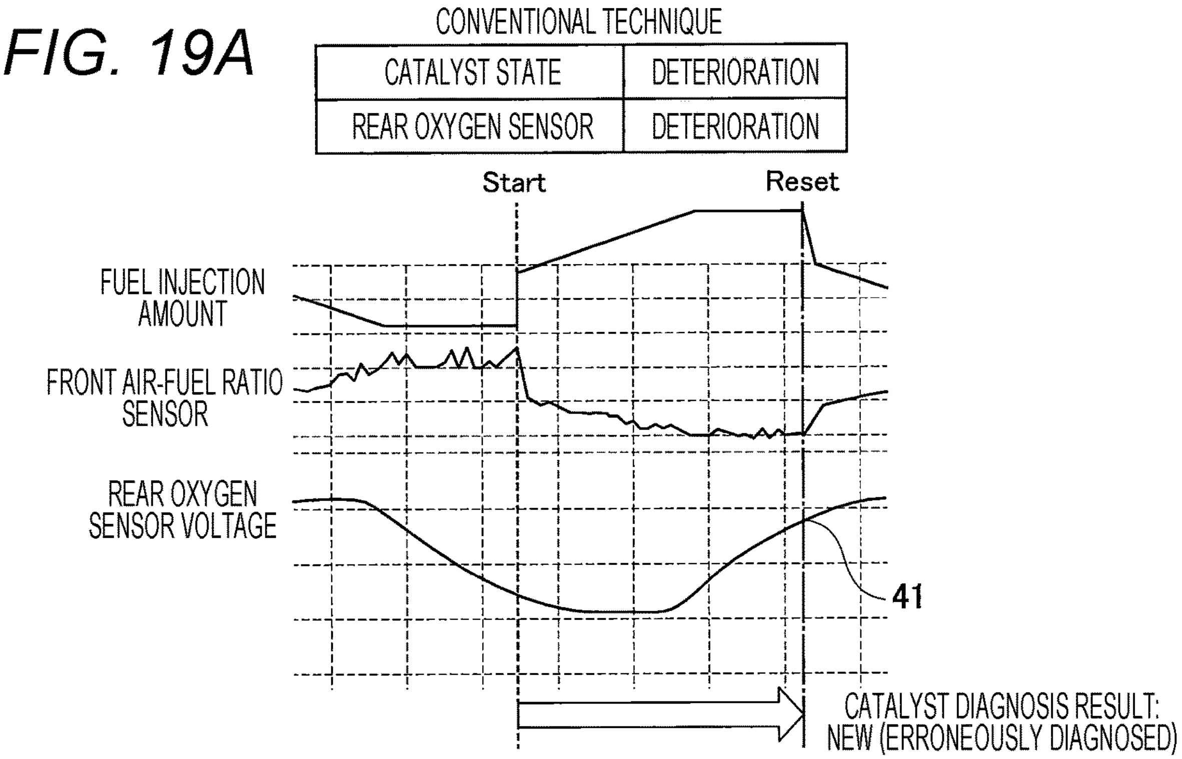
FIG. 19A is a diagram illustrating an example of a diagnosis result of a catalyst state using a conventional technique.
Figure 19B:
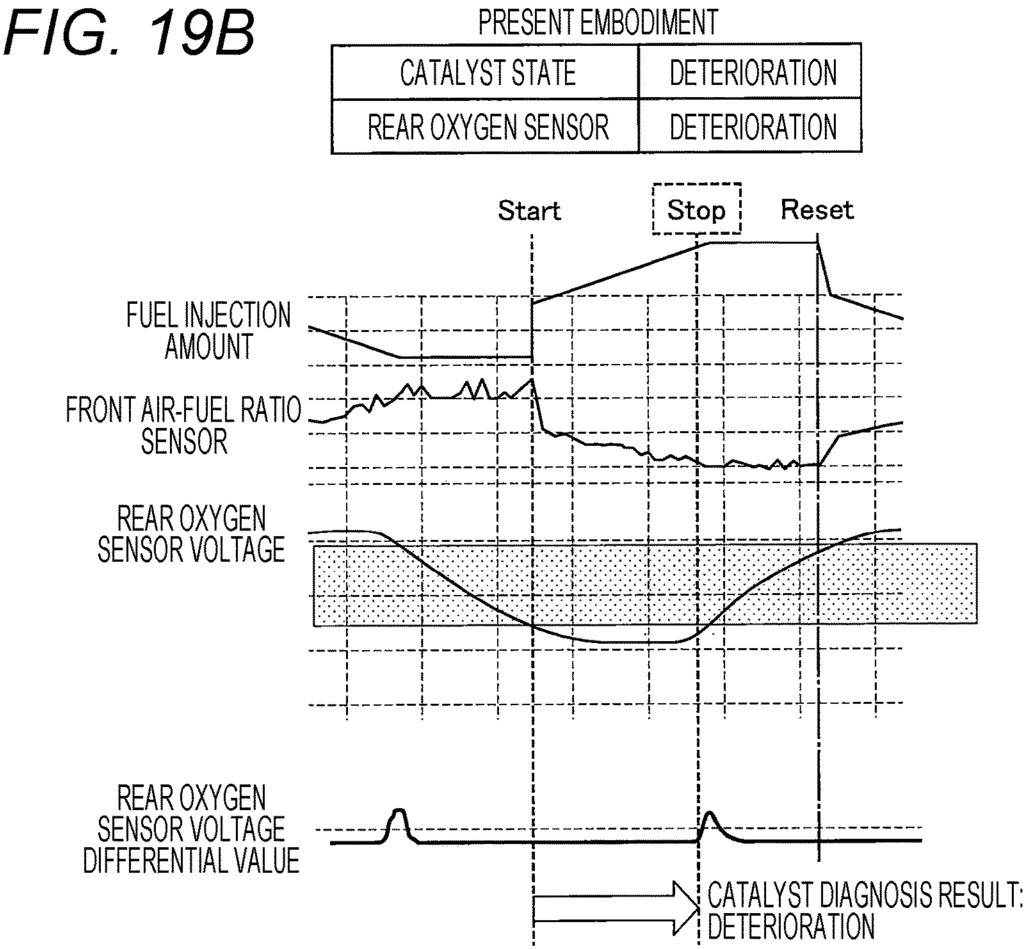
FIG. 19B is a diagram illustrating an example of a diagnosis result of a catalyst state using the technology according to the first embodiment of the present invention.

FIGS. 19A and 19B are diagrams for explaining effects of the conventional technique and effects of the ECU 28 according to the present embodiment. Here, the influence of the deterioration of the rear oxygen sensor 22 on the catalyst diagnosis is illustrated. It is also assumed that both the catalyst and the rear oxygen sensor 22 are deteriorated.

FIG. 19A is a diagram illustrating an example of a diagnosis result of a catalyst state using a conventional technique. FIG. 19A is the same as FIG. 14B.

As described above, in the conventional technique, since there is an influence of the delay 41 due to the deterioration of the rear oxygen sensor 22, the rear oxygen sensor voltage is output with a delay. Therefore, the conventional ECU integrates the oxygen storage amount from the time point (Start) when the fuel injection amount increases to the time point (Reset) when the fuel injection amount decreases, and calculates the excessive oxygen storage amount. As a result, in the catalyst diagnosis of the conventional ECU, it is determined that the catalyst can store a large amount of oxygen even though the catalyst is in a deterioration state, whereby the catalyst is erroneously diagnosed as a new state.

FIG. 19B is a diagram illustrating an example of a diagnosis result of the catalyst state using the technology according to the present embodiment.

The ECU 28 according to the present embodiment recognizes that the rear oxygen sensor voltage falls within the predetermined value range and that the differential value of the rear oxygen sensor voltage is equal to or greater than a certain threshold. Therefore, the ECU 28 can detect the rising timing of the rear oxygen sensor voltage without being affected by the deterioration of the rear oxygen sensor 22. Then, the ECU 28 can accurately grasp the stop timing of the oxygen storage amount integration and obtain the oxygen storage amount according to the state of the catalyst.

In addition, the ECU 28 detects the rising timing of the differential value of the rear oxygen sensor voltage to eliminate the delay caused by the deterioration of the rear oxygen sensor 22 as much as possible. This method is easily affected by noise associated with differential operation, and there is a possibility that erroneous diagnosis of the catalyst state is made. Therefore, the ECU 28 can eliminate the influence of noise due to the differential operation and prevent erroneous diagnosis of the catalyst state by setting the AND condition between the rising timing of the differential value of the rear oxygen sensor voltage and the range of the predetermined value of the rear oxygen sensor 22.

In addition, due to the characteristics of the rear oxygen sensor 22, the rear oxygen sensor voltage may transition at a certain voltage value (for example, around 0.15 V or 0.65 V). For this reason, the ECU 28 detects whether or not there is a transient movement in the rear oxygen sensor voltage by using not only the threshold but also the differential value. By setting both to the AND condition, it is possible to set an appropriate stop timing of the oxygen storage amount integration.

The ECU 28 according to the first embodiment described above can accurately grasp the stop timing of the oxygen storage amount integration and obtain the oxygen storage amount according to the catalyst state by grasping that the rear oxygen sensor voltage has entered the predetermined threshold range (band 51) and that the time differential value of the rear oxygen sensor voltage has become equal to or larger than a certain differential value threshold after the start of the oxygen storage amount integration. By detecting the rising timing of the differential value, a delay caused by deterioration of the rear oxygen sensor can be eliminated as much as possible. In addition, by setting the AND condition between the rising timing of the differential value and the range of the predetermined value of the rear oxygen sensor, the influence of noise associated with the differential operation can be eliminated, and erroneous diagnosis can be prevented. Therefore, the ECU 28 can keep the purification efficiency of the three-way catalyst high and prevent deterioration of emission performance.

Second Embodiment

In the oxygen storage amount integration unit 133 according to the first embodiment illustrated in FIG. 3, an example has been illustrated in which the catalyst deterioration diagnosis unit 134 diagnoses the deterioration of the three-way catalyst based on the integrated estimated oxygen storage amount, and the air-fuel ratio correction unit 135 calculates the corrected target air-fuel ratio. Here, another embodiment for obtaining the estimated oxygen storage amount will be described.

Figure 20:
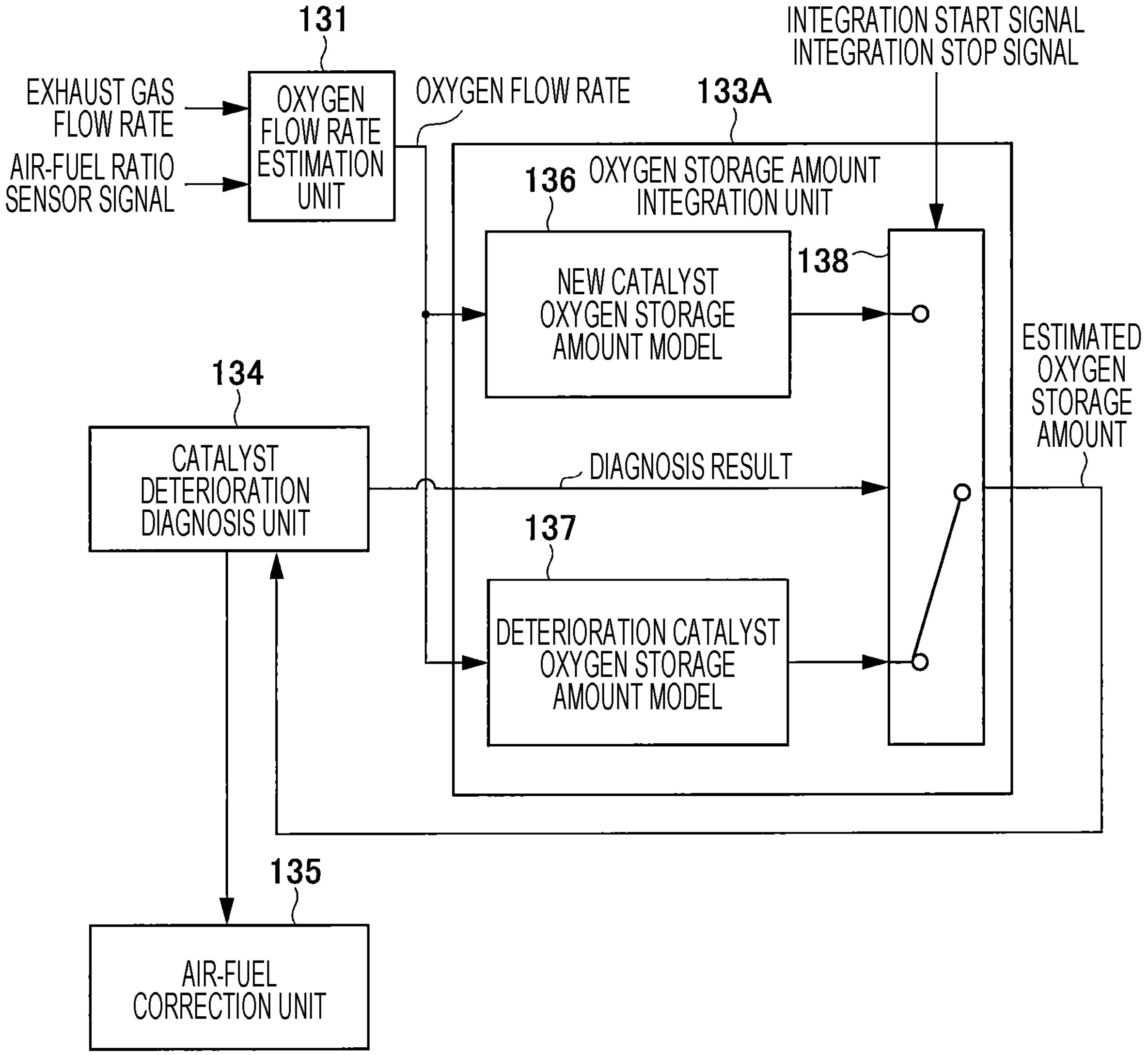
FIG. 20 is a block diagram illustrating a configuration example of an oxygen storage amount integration unit according to a second embodiment of the present invention.

FIG. 20 is a block diagram illustrating an internal configuration example of an oxygen storage amount integration unit 133A according to the second embodiment. The oxygen storage amount integration unit 133A includes a plurality of different oxygen storage amount models for estimating the oxygen storage amount of the three-way catalyst.

The oxygen storage amount integration unit 133A includes a new catalyst oxygen storage amount model 136, a deterioration catalyst oxygen storage amount model 137, and a model selection unit 138. The plurality of oxygen storage amount models (new catalyst oxygen storage amount model 136, deterioration catalyst oxygen storage amount model 137) are selected by the model selection unit 138 according to the state of the three-way catalyst (exhaust purification catalyst 21).

The new catalyst oxygen storage amount model 136 is a model that estimates the oxygen storage amount that can be stored in the new catalyst based on the oxygen flow rate input from the oxygen flow rate estimation unit 131.

The deterioration catalyst oxygen storage amount model 137 is a model that estimates the oxygen storage amount that the deterioration catalyst can store based on the oxygen flow rate input from the oxygen flow rate estimation unit 131.

The model selection unit (model selection unit 138) integrates the oxygen storage amount by one oxygen storage amount model selected from a plurality of oxygen storage amount models (New catalyst oxygen storage amount model 136, deterioration catalyst oxygen storage amount model 137) according to the diagnosis result input from the catalyst deterioration diagnosis unit 134. When the deterioration diagnosis result is new, the model selection unit 138 selects the new catalyst oxygen storage amount model 136 as a model for estimating the oxygen storage amount, and integrates the oxygen storage amount using the new catalyst oxygen storage amount model 136 until the integration start signal is input and the integration stop signal is input. Meanwhile, when the result of the deterioration diagnosis is deterioration, the model selection unit 138 selects the deterioration catalyst oxygen storage amount model 137 as a model for estimating the oxygen storage amount, and integrates the oxygen storage amount using the deterioration catalyst oxygen storage amount model 137 until the integration start signal is input and the integration stop signal is input.

The oxygen storage amount integrated by the model selection unit 138 is output to the catalyst deterioration diagnosis unit 134 as an estimated oxygen storage amount. Then, the catalyst deterioration diagnosis unit 134 performs the catalyst deterioration diagnosis again. As illustrated in FIG. 3, the diagnosis result by the catalyst deterioration diagnosis unit 134 is output to the air-fuel ratio correction unit 135.

The oxygen storage amount integration unit 133A according to the second embodiment described above can obtain the estimated oxygen storage amount by switching the oxygen storage amount models of the new catalyst and the deterioration catalyst based on the diagnosis result of catalyst deterioration. As the oxygen storage amount model, it is possible to obtain the estimated oxygen storage amount according to the deterioration state of the three-way catalyst by preparing a plurality of oxygen storage amount models according to the small deterioration and the large deterioration in accordance with the use time of the three-way catalyst in addition to the new one and the deterioration.

Note that the present invention is not limited to the above-described embodiments, and it is obvious that various other application examples and modifications can be taken without departing from the gist of the present invention described in the claims.

For example, the above-described embodiments describe the configuration of the system in detail and specifically in order to describe the present invention in an easy-to-understand manner, and are not necessarily limited to those having all the described configurations. In addition, it is also possible to add, delete, and replace other configurations for a part of the configuration of the present embodiment.

In addition, the control lines and the information lines indicate what is considered to be necessary for the description, and do not necessarily indicate all the control lines and the information lines on the product. In practice, it may be considered that almost all the configurations are connected to each other.

REFERENCE SIGNS LIST

1 internal combustion engine
20 front air-fuel ratio sensor
21 exhaust purification catalyst
22 rear oxygen sensor
28 ECU
100 internal combustion engine control system
110 post-processing system
120 integration stop determination unit
121 differential value determination unit
122 voltage value determination unit
123 condition determination unit
131 oxygen flow rate estimation unit
132 integration start determination unit
133 oxygen storage amount integration unit
134 catalyst deterioration diagnosis unit
135 air-fuel ratio correction unit

The invention claimed is:

1. An internal combustion engine control device that controls an internal combustion engine including an air-fuel ratio sensor that is disposed upstream of a three-way catalyst provided in an exhaust pipe and detects an air-fuel ratio of exhaust gas and an oxygen concentration sensor that is disposed downstream of the three-way catalyst and detects an oxygen concentration of the exhaust gas, the internal combustion engine control device comprising an oxygen storage amount integration unit that integrates an oxygen storage amount stored in the three-way catalyst in a period from an integration start position where the air-fuel ratio of exhaust gas starts to change from lean to rich or from rich to lean to an integration stop position where the oxygen concentration that has increased or decreased from before the integration start position is reversed;

an integration stop determination unit that determines the integration stop position;

an oxygen flow rate estimation unit that estimates an oxygen flow rate of the exhaust gas based on a flow rate of the exhaust gas and the air-fuel ratio; and an integration start determination unit that determines the integration start position based on the air-fuel ratio, wherein the oxygen storage amount integration unit integrates the oxygen storage amount based on the oxygen flow rate, the integration start position, and the integration stop position, wherein the oxygen storage amount integration unit sets a timing at which a voltage value, output from the oxygen concentration sensor delayed from an integration start position under a rich condition where the air-fuel ratio of exhaust gas starts to change from rich to lean after changing from lean to rich, becomes a voltage value exceeding a voltage upper limit threshold by a maximum electromotive force under rich of the air-fuel ratio, and thereafter, decreases and falls within a range of the voltage upper limit threshold and a voltage lower limit threshold, and a differential value of the voltage value when the voltage value decreases exceeds a differential value threshold, as an integration stop position under the rich condition, and a timing at which a voltage value, output from the oxygen concentration sensor delayed from an integration start position under a lean condition where the air-fuel ratio of exhaust gas starts to change from lean to rich after changing from rich to lean, becomes a voltage value lower than the voltage lower limit threshold by a minimum electromotive force under lean of the air-fuel ratio, and thereafter, increases and falls within the range of the voltage upper limit threshold and the voltage lower limit threshold, and a differential value of the voltage value when the voltage value increases exceeds a differential value threshold, as an integration stop position under the lean condition.

2. The internal combustion engine control device according to claim 1, wherein the differential value has a positive or negative sign according to a change direction of a voltage value output from the oxygen concentration sensor, and a positive or negative sign of the differential value threshold is different between a case where the integration stop position under the rich condition is determined and a case where the integration stop position under the lean condition is determined.

3. The internal combustion engine control device according to claim 2, wherein the differential value and the differential value threshold are converted into absolute values.

4. The internal combustion engine control device according to claim 2, further comprising:

a catalyst diagnosis unit that diagnoses a state of the three-way catalyst based on the oxygen storage amount and outputs a diagnosis result; and an air-fuel ratio correction unit that corrects a target air-fuel ratio of the internal combustion engine according to an air-fuel ratio target value and the diagnosis result and outputs a corrected target air-fuel ratio.

5. The internal combustion engine control device according to claim 4, wherein the diagnosis result is expressed as a state level value assigned to each state of the three-way catalyst.

6. The internal combustion engine control device according to claim 4, wherein the oxygen storage amount integration unit includes a plurality of oxygen storage amount models that are selected according to a state of the three-way catalyst, and a model selection unit that integrates the oxygen storage amount by one oxygen storage amount model selected from the plurality of oxygen storage amount models according to the diagnosis result.

7. An internal combustion engine control method performed by an internal combustion engine control device that controls an internal combustion engine including an air-fuel ratio sensor that is disposed upstream of a three-way catalyst provided in an exhaust pipe and detects an air-fuel ratio of exhaust gas and an oxygen concentration sensor that is disposed downstream of the three-way catalyst and detects an oxygen concentration of the exhaust gas, the internal combustion engine control method comprising;

setting a timing at which a voltage value, output from the oxygen concentration sensor delayed from an integration start position under a rich condition where the air-fuel ratio of exhaust gas starts to change from rich to lean after changing from lean to rich, becomes a voltage value exceeding a voltage upper limit threshold by a maximum electromotive force under rich of the air-fuel ratio, and thereafter, decreases and falls within a range of a voltage upper limit threshold and a voltage lower limit threshold, and a differential value of the voltage value when the voltage value decreases exceeds a differential value threshold, as an integration stop position under the rich condition;

setting a timing at which a voltage value, output from the oxygen concentration sensor delayed from an integration start position under a lean condition where the air-fuel ratio of exhaust gas starts to change from lean to rich after changing from rich to lean, becomes a voltage value lower than the voltage lower limit threshold by a minimum electromotive force under lean of the air-fuel ratio, and thereafter, increases and falls within the range of the voltage upper limit threshold and the voltage lower limit threshold, and a differential value of the voltage value when the voltage value increases exceeds a differential value threshold, as an integration stop position under the lean condition; and performing processing of integrating an oxygen storage amount stored in the three-way catalyst in a period from an integration start position under the rich condition to an integration stop position under the rich condition, or a period from an integration start position under the lean condition to an integration stop position under the lean condition.

* * * * *